United States Patent
Angus et al.

(10) Patent No.: US 10,712,431 B1
(45) Date of Patent: Jul. 14, 2020

(54) SYSTEMS AND METHODS FOR REFRACTIVE BEAM-STEERING

(71) Applicant: Blackmore Sensors & Analytics, LLC, Palo Alto, CA (US)

(72) Inventors: Edward Joseph Angus, Bozeman, MT (US); Ryan Moore Galloway, Bozeman, MT (US)

(73) Assignee: BLACKMORE SENSORS & ANALYTICS, LLC, Palo Alto, CA (US)

(*) Notice: Subject to any disclaimer, the term of this patent is extended or adjusted under 35 U.S.C. 154(b) by 0 days.

(21) Appl. No.: 16/725,419

(22) Filed: Dec. 23, 2019

Related U.S. Application Data

(60) Provisional application No. 62/788,368, filed on Jan. 4, 2019.

(51) Int. Cl.
| | |
|---|---|
| *G01C 3/08* | (2006.01) |
| *G01S 7/481* | (2006.01) |
| *G02B 26/10* | (2006.01) |
| *G01S 17/931* | (2020.01) |
| *G01S 17/89* | (2020.01) |
| *G01S 7/4861* | (2020.01) |

(52) U.S. Cl.
CPC .......... *G01S 7/4817* (2013.01); *G01S 7/4861* (2013.01); *G01S 17/89* (2013.01); *G01S 17/931* (2020.01); *G02B 26/105* (2013.01)

(58) Field of Classification Search
None
See application file for complete search history.

(56) References Cited

U.S. PATENT DOCUMENTS

| | | | | |
|---|---|---|---|---|
| 5,216,534 A | * | 6/1993 | Boardman | ........... G02B 26/108 359/209.1 |
| 5,223,986 A | * | 6/1993 | Mayerjak | ................ G02B 5/00 353/122 |
| 5,227,910 A | | 7/1993 | Khattak | |
| 5,231,401 A | * | 7/1993 | Kaman | .................. G01S 17/89 250/332 |

(Continued)

FOREIGN PATENT DOCUMENTS

| | | |
|---|---|---|
| DE | 10 2017 200 692 A1 | 8/2018 |
| EP | 3 330 766 A1 | 6/2018 |
| GB | 2349231 A * 10/2000 | ........... G02F 1/1334 |

OTHER PUBLICATIONS

International Search Report and Written Opinion issued on PCT/US2019/068351 dated Apr. 9, 2020 pp. 1-14.

*Primary Examiner* — Isam A Alsomiri
*Assistant Examiner* — Amir J Askarian
(74) *Attorney, Agent, or Firm* — Foley & Lardner LLP

(57) ABSTRACT

A LIDAR apparatus can include a polygon deflector that includes a plurality of facets. The LIDAR apparatus can include a motor rotatably coupled to the polygon deflector. The motor is configured to rotate the polygon deflector about a first axis orthogonal to a first plane. The LIDAR apparatus can include an optic positioned within an interior of the polygon deflector. The optic collimates a first beam to be incident on a particular facet of the plurality of facet. The particular facet of the plurality of facets refracts the first beam in the first plane between a first angle and a second angle as the polygon deflector rotates about the first axis to output a second beam.

19 Claims, 15 Drawing Sheets

(56) References Cited

U.S. PATENT DOCUMENTS

| | | | | |
|---|---|---|---|---|
| 5,999,302 A * | 12/1999 | Sweeney | ............... | G02B 26/122 |
| | | | | 359/216.1 |
| 2002/0140924 A1 * | 10/2002 | Wangler | ................ | G01S 7/4802 |
| | | | | 356/28 |
| 2004/0222366 A1 | 11/2004 | Frick | | |
| 2009/0009842 A1 * | 1/2009 | Destain | .................. | G02B 26/12 |
| | | | | 359/209.1 |
| 2013/0120989 A1 * | 5/2013 | Sun | ......................... | F21S 2/005 |
| | | | | 362/244 |
| 2015/0282707 A1 * | 10/2015 | Tanabe | .................... | A61B 3/102 |
| | | | | 351/206 |
| 2017/0329014 A1 * | 11/2017 | Moon | .................... | G01S 7/4912 |
| 2018/0188355 A1 * | 7/2018 | Bao | ....................... | G02B 26/126 |
| 2018/0284286 A1 * | 10/2018 | Eichenholz | ............. | G01S 17/87 |
| 2019/0361119 A1 * | 11/2019 | Kim | ......................... | G01S 17/08 |
| 2020/0025879 A1 * | 1/2020 | Pacala | ..................... | H02J 7/025 |

\* cited by examiner

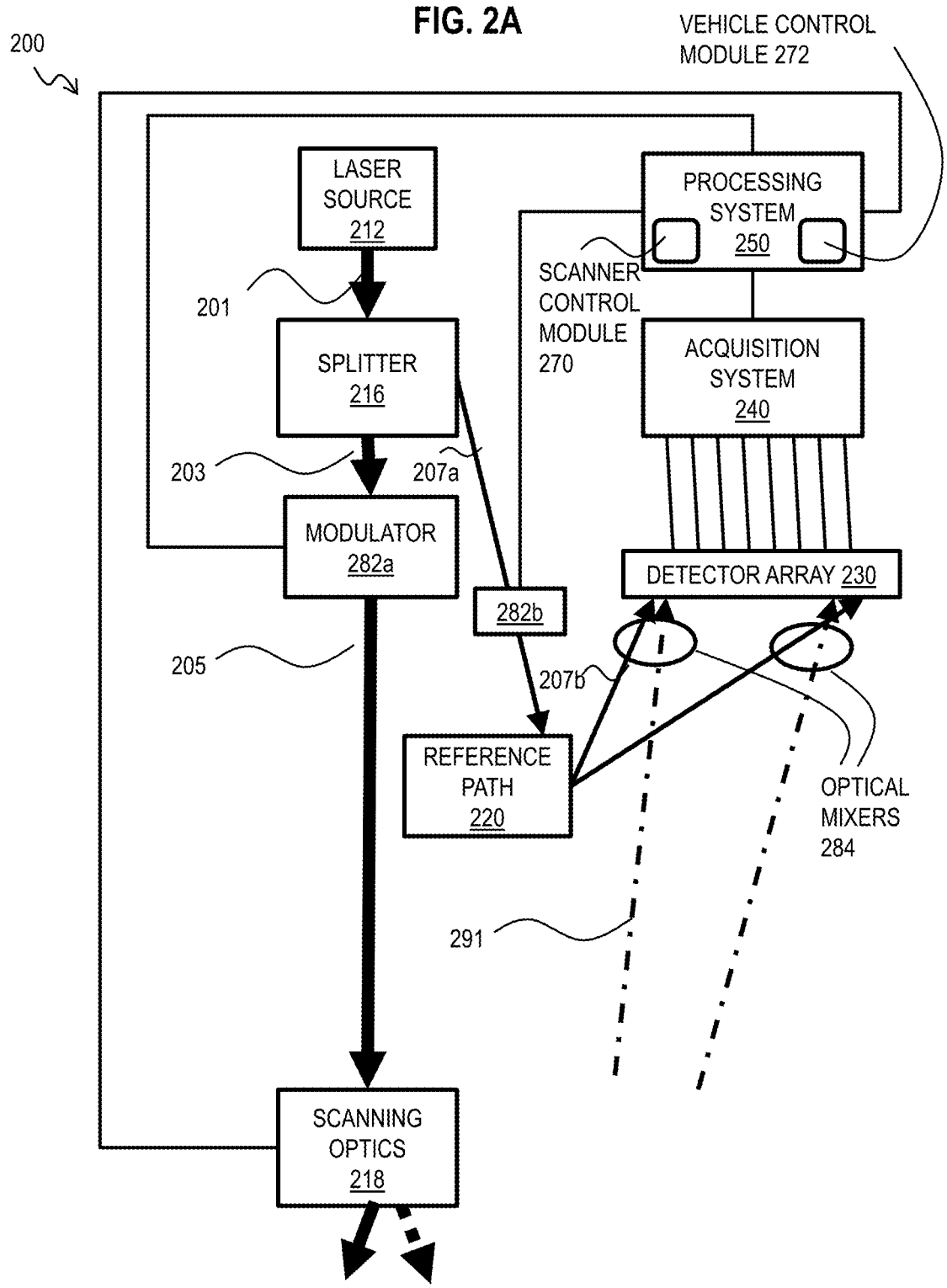

SYSTEMS AND METHODS FOR REFRACTIVE BEAM-STEERING

CROSS-REFERENCE TO RELATED APPLICATIONS

The present application claims the benefit of and priority to U.S. Provisional Application No. 62/788,368, filed Jan. 4, 2019, the entire disclosure of which is incorporated herein by reference.

BACKGROUND

Optical detection of range using lasers, often referenced by a mnemonic, LIDAR, for light detection and ranging, also sometimes called laser RADAR, is used for a variety of applications, from altimetry, to imaging, to collision avoidance. LIDAR provides finer scale range resolution with smaller beam sizes than conventional microwave ranging systems, such as radio-wave detection and ranging (RADAR).

SUMMARY

At least one aspect relates to a LIDAR apparatus. The LIDAR apparatus can include a polygon deflector that includes a plurality of facets. The LIDAR apparatus can include a motor rotatably coupled to the polygon deflector. The motor is configured to rotate the polygon deflector about a first axis orthogonal to a first plane. The LIDAR apparatus can include an optic positioned within an interior of the polygon deflector. The optic is configured to collimate a first beam to be incident on a particular facet of the plurality of facet. The particular facet of the plurality of facets is configured to refract the first beam in the first plane between a first angle and a second angle as the polygon deflector rotates about the first axis to output a second beam.

At least one aspect relates to a LIDAR system. The LIDAR system can include a polygon deflector that includes a plurality of facets. The LIDAR system can include a detector array. The LIDAR system can include a processing circuit configured to cause the polygon deflector to rotate about a first axis at a rotational frequency, cause a laser source to transmit a first beam in an interior of the polygon deflector so that the polygon deflector refracts the first beam in a first plane between a first angle and a second angle, the first plane orthogonal to the first axis, receive a signal from the detector array based on a second beam received at the detector array from an object responsive to the first beam, and determine a range to the object based on the signal received from the detector array.

At least one aspect relates to an autonomous vehicle that includes a LIDAR apparatus. The LIDAR apparatus can include a polygon deflector that includes a plurality of facets. The LIDAR apparatus can include a motor rotatably coupled to the polygon deflector. The motor is configured to rotate the polygon deflector about a first axis orthogonal to a first plane. The LIDAR apparatus can include an optic positioned within an interior of the polygon deflector. The optic is configured to collimate a first beam to be incident on a particular facet of the plurality of facet. The particular facet of the plurality of facets is configured to refract the first beam in the first plane between a first angle and a second angle as the polygon deflector rotates about the first axis to output a second beam.

At least one other aspect relates to a method. The method can include rotating about a first axis, by a motor, a polygon deflector comprising a plurality of facets, shaping, by an optic in an interior of the polygon deflector, a beam incident on one of the facets, and refracting, by each facet of the plurality of facets, the beam in a first plane orthogonal to the first axis between a first angle and a second angle as the polygon deflector is rotated about the first axis. Those skilled in the art will appreciate that the summary is illustrative only and is not intended to be in any way limiting. Any of the features described herein may be used with any other features, and any subset of such features can be used in combination according to various embodiments. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Embodiments are illustrated by way of example, and not by way of limitation, in the figures of the accompanying drawings in which like reference numerals refer to similar elements and in which:

FIG. 2A is a block diagram that illustrates example components of a high resolution (hi res) LIDAR system, according to an implementation;

DETAILED DESCRIPTION

Figure 1A:
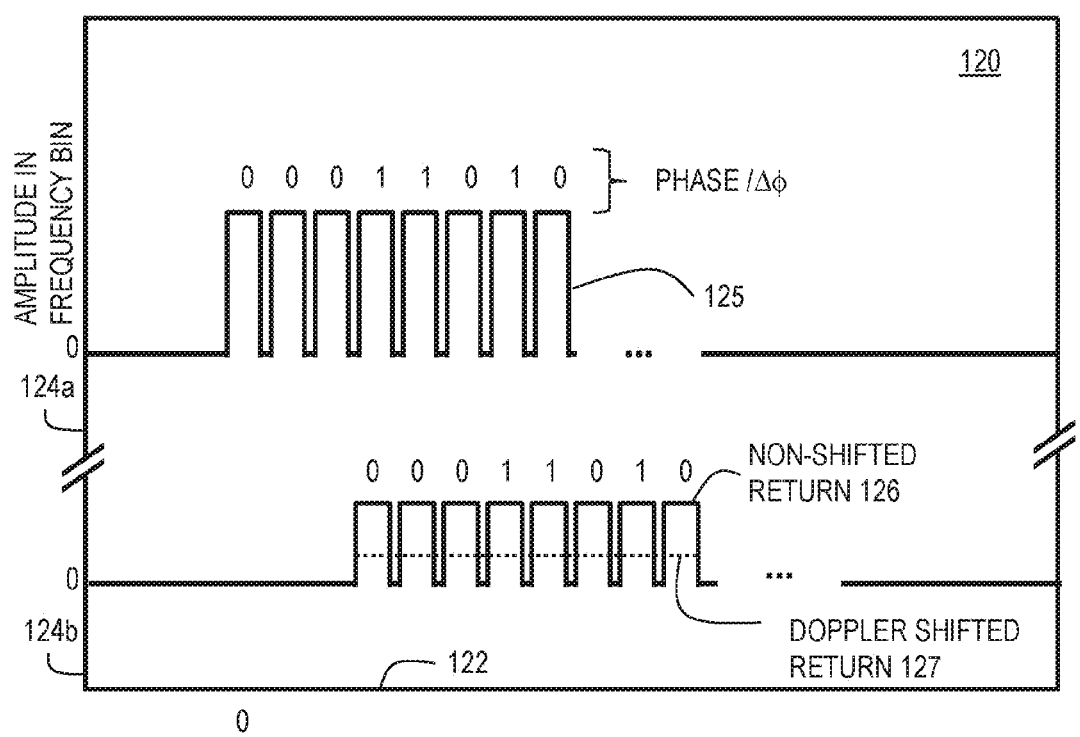
FIG. 1A is a schematic graph that illustrates the example transmitted signal of a series of binary digits along with returned optical signals for measurement of range, according to an implementation.

A method and apparatus and system and computer-readable medium are described for scanning of a LIDAR system. Some implementations are described below in the context of a hi-res LIDAR system. An implementation is described in the context of optimization of scanning a beam by a unidirectional scan element of a LIDAR system, including both Doppler and non-Doppler LIDAR systems. An implementation is described in the context of optimization of scanning a beam by a polygon deflector, such as a polygon deflector that is configured to deflect or refract a beam incident on a facet of the polygon deflector from an interior of the polygon deflector. A polygon deflector can be polygon shaped element with a number of facets based on the polygon structure. Each facet is configured to deflect (e.g. reflect an incident light beam on the facet or refract an incident light beam from within an interior of the polygon shaped element) over a field of view as the polygon deflector is rotated about an axis. The polygon deflector repeatedly scans the beam over the field of view as the beam transitions over a facet break between adjacent facets during the rotation of the polygon deflector. Some implementations are described in the context of single front mounted hi-res Doppler LIDAR system on a personal automobile; but, various implementations are not limited to this context. Some implementations can be used in the context of laser etching, surface treatment, barcode scanning, and refractive scanning of a beam.

Some scanning systems utilize polygon reflectors which are regularly shaped reflective objects that spin relative to a static incident light beam. The reflective facet causes a repeating reflection of light in a direction over a field of view. There can be several drawbacks of such polygon reflectors. For example, the incident light beam on the reflective facet inherently limits the field of view since the field of view cannot include angles encompassing the incident light beam that is coplanar with the reflective facet. Useful return beam data cannot be attained if the field of view extended over angles that encompassed the incident light beam and thus the field of view is inherently limited by the incident light beam. This can also inherently limit the duty cycle or ratio of time when the beam is scanned over the field of view to a total operation time of the polygon reflectors. Various systems and methods in accordance with the present disclosure can use a refractive beam-steering assembly and method that utilizes a polygon deflector that deflects (e.g. refracts) an incident light beam over a field of view rather than reflecting the incident light beam over a field of view. The polygon deflector can enhance both the field of view and the duty cycle since the incident light beam is directed from within an interior of the deflector and thus does not inherently limit the field of view.

A LIDAR apparatus can scan a beam in a first plane between a first angle and a second angle. The apparatus includes a polygon deflector comprising a plurality of facets and a motor rotatably coupled to the polygon deflector and configured to rotate the polygon deflector about a first axis orthogonal to the first plane. The apparatus also includes an optic positioned within an interior of the polygon deflector to collimate the beam incident on the facet from the interior of the polygon deflector. Each facet is configured to refract the beam in the first plane between the first angle and the second angle as the polygon deflector is rotated about the first axis. Systems and methods can be provided that implement the LIDAR apparatus.

1. Phase-Encoded Detection Overview

Using an optical phase-encoded signal for measurement of range, the transmitted signal is in phase with a carrier (phase=0) for part of the transmitted signal and then changes by one or more phases changes represented by the symbol $\Delta\phi$ (so phase=$\Delta\phi$) for short time intervals, switching back and forth between the two or more phase values repeatedly over the transmitted signal. The shortest interval of constant phase is a parameter of the encoding called pulse duration $\tau$ and is typically the duration of several periods of the lowest frequency in the band. The reciprocal, $1/\tau$, is baud rate, where each baud indicates a symbol. The number N of such constant phase pulses during the time of the transmitted signal is the number N of symbols and represents the length of the encoding. In binary encoding, there are two phase values and the phase of the shortest interval can be considered a 0 for one value and a 1 for the other, thus the symbol is one bit, and the baud rate is also called the bit rate. In multiphase encoding, there are multiple phase values. For example, 4 phase values such as $\Delta\phi^*$ {0, 1, 2 and 3}, which, for $\Delta\phi=\pi/2$ (90 degrees), equals {0, $\pi/2$, $\pi$ and $3\pi/2$}, respectively; and, thus 4 phase values can represent 0, 1, 2, 3, respectively. In this example, each symbol is two bits and the bit rate is twice the baud rate.

Phase-shift keying (PSK) refers to a digital modulation scheme that conveys data by changing (modulating) the phase of a reference signal (the carrier wave). The modulation is impressed by varying the sine and cosine inputs at a precise time. At radio frequencies (RF), PSK is widely used for wireless local area networks (LANs), RF identification (RFID) and Bluetooth communication. Alternatively, instead of operating with respect to a constant reference wave, the transmission can operate with respect to itself. Changes in phase of a single transmitted waveform can be considered the symbol. In this system, the demodulator determines the changes in the phase of the received signal rather than the phase (relative to a reference wave) itself.

Since this scheme depends on the difference between successive phases, it is termed differential phase-shift keying (DPSK). DPSK can be significantly simpler to implement in communications applications than ordinary PSK, since there is no need for the demodulator to have a copy of the reference signal to determine the exact phase of the received signal (thus, it is a non-coherent scheme).

Optical detection of range can be accomplished with several different techniques, including direct ranging based on round trip travel time of an optical pulse to an object, and chirped detection based on a frequency difference between a transmitted chirped optical signal and a returned signal scattered from an object, and phase-encoded detection based on a sequence of single frequency phase changes that are distinguishable from natural signals.

To achieve acceptable range accuracy and detection sensitivity, direct long range LIDAR systems may use short pulse lasers with low pulse repetition rate and extremely high pulse peak power. The high pulse power can lead to rapid degradation of optical components. Chirped and phase-encoded LIDAR systems may use long optical pulses with relatively low peak optical power. In this configuration, the range accuracy can increase with the chirp bandwidth or length and bandwidth of the phase codes rather than the pulse duration, and therefore excellent range accuracy can still be obtained.

Useful optical bandwidths have been achieved using wideband radio frequency (RF) electrical signals to modulate an optical carrier. With respect to LIDAR, using the same modulated optical carrier as a reference signal that is combined with the returned signal at an optical detector can produce in the resulting electrical signal a relatively low beat frequency in the RF band that is proportional to the difference in frequencies or phases between the references and returned optical signals. This kind of beat frequency detection of frequency differences at a detector is called heterodyne detection. It has several advantages known in the art, such as the advantage of using RF components of ready and inexpensive availability.

Hi-res range-Doppler LIDAR systems can use an arrangement of optical components and coherent processing to detect Doppler shifts in returned signals to provide improved range and relative signed speed on a vector between the LIDAR system and each external object.

In some instances, these improvements provide range, with or without target speed, in a pencil thin laser beam of proper frequency or phase content. When such beams are swept over a scene, information about the location and speed of surrounding objects can be obtained. This information can be used in control systems for autonomous vehicles, such as self driving, or driver assisted, automobiles.

For optical ranging applications, since the transmitter and receiver are in the same device, coherent PSK can be used. The carrier frequency is an optical frequency fc and a RF $f_0$ is modulated onto the optical carrier. The number N and duration τ of symbols are selected to achieve the desired range accuracy and resolution. The pattern of symbols is selected to be distinguishable from other sources of coded signals and noise. Thus a strong correlation between the transmitted and returned signal can be a strong indication of a reflected or backscattered signal. The transmitted signal is made up of one or more blocks of symbols, where each block is sufficiently long to provide strong correlation with a reflected or backscattered return even in the presence of noise. The transmitted signal can be made up of M blocks of N symbols per block, where M and N are non-negative integers.

FIG. 1A is a schematic graph 120 that illustrates the example transmitted signal as a series of binary digits along with returned optical signals for measurement of range, according to an implementation. The horizontal axis 122 indicates time in arbitrary units after a start time at zero. The vertical axis 124a indicates amplitude of an optical transmitted signal at frequency $fc+f_0$ in arbitrary units relative to zero. The vertical axis 124b indicates amplitude of an optical returned signal at frequency $fc+f_0$ in arbitrary units relative to zero, and is offset from axis 124a to separate traces. Trace 125 represents a transmitted signal of M*N binary symbols, with phase changes as shown in FIG. 1A to produce a code starting with 00011010 and continuing as indicated by ellipsis. Trace 126 represents an idealized (noiseless) return signal that is scattered from an object that is not moving (and thus the return is not Doppler shifted). The amplitude is reduced, but the code 00011010 is recognizable. Trace 127 represents an idealized (noiseless) return signal that is scattered from an object that is moving and is therefore Doppler shifted. The return is not at the proper optical frequency $fc+f_0$ and is not well detected in the expected frequency band, so the amplitude is diminished.

The observed frequency f' of the return differs from the correct frequency $f=fc+f_0$ of the return by the Doppler effect given by Equation 1.

$$f' = \frac{(c + v_o)}{(c + v_s)} f \qquad (1)$$

Where c is the speed of light in the medium, $v_o$ is the velocity of the observer and $v_s$ is the velocity of the source along the vector connecting source to receiver. Note that the two frequencies are the same if the observer and source are moving at the same speed in the same direction on the vector between the two. The difference between the two frequencies, Δf=f'−f, is the Doppler shift, $\Delta f_D$, which causes problems for the range measurement, and is given by Equation 2.

$$\Delta f_D = \left[\frac{(c + v_o)}{(c + v_s)} - 1\right] f \qquad (2)$$

Note that the magnitude of the error increases with the frequency f of the signal. Note also that for a stationary LIDAR system ($v_o$=0), for an object moving at 10 meters a second ($v_s$=10), and visible light of frequency about 500 THz, then the size of the error is on the order of 16 megahertz (MHz, 1 MHz=$10^6$ hertz, Hz, 1 Hz=1 cycle per second). In various implementations described below, the Doppler shift error is detected and used to process the data for the calculation of range.

In phase coded ranging, the arrival of the phase coded reflection can be detected in the return by cross correlating the transmitted signal or other reference signal with the returned signal, which can be implemented by cross correlating the code for a RF signal with an electrical signal from an optical detector using heterodyne detection and thus down-mixing back to the RF band. Cross correlation for any one lag can be computed by convolving the two traces, e.g., multiplying corresponding values in the two traces and summing over all points in the trace, and then repeating for each time lag. The cross correlation can be accomplished by a multiplication of the Fourier transforms of each of the two traces followed by an inverse Fourier transform. Forward and inverse Fast Fourier transforms can be efficiently implemented in hardware and software.

Note that the cross correlation computation may be done with analog or digital electrical signals after the amplitude and phase of the return is detected at an optical detector. To move the signal at the optical detector to a RF frequency range that can be digitized easily, the optical return signal is optically mixed with the reference signal before impinging on the detector. A copy of the phase-encoded transmitted optical signal can be used as the reference signal, but it is also possible, and often preferable, to use the continuous wave carrier frequency optical signal output by the laser as the reference signal and capture both the amplitude and phase of the electrical signal output by the detector.

For an idealized (noiseless) return signal that is reflected from an object that is not moving (and thus the return is not Doppler shifted), a peak occurs at a time $\Delta t$ after the start of the transmitted signal. This indicates that the returned signal includes a version of the transmitted phase code beginning at the time $\Delta t$. The range R to the reflecting (or backscattering) object is computed from the two way travel time delay based on the speed of light c in the medium, as given by Equation 3.

$$R = c * \Delta t/2 \tag{3}$$

For an idealized (noiseless) return signal that is scattered from an object that is moving (and thus the return is Doppler shifted), the return signal does not include the phase encoding in the proper frequency bin, the correlation stays low for all time lags, and a peak is not as readily detected, and is often undetectable in the presence of noise. Thus $\Delta t$ is not as readily determined and range R is not as readily produced.

Figure 1B:
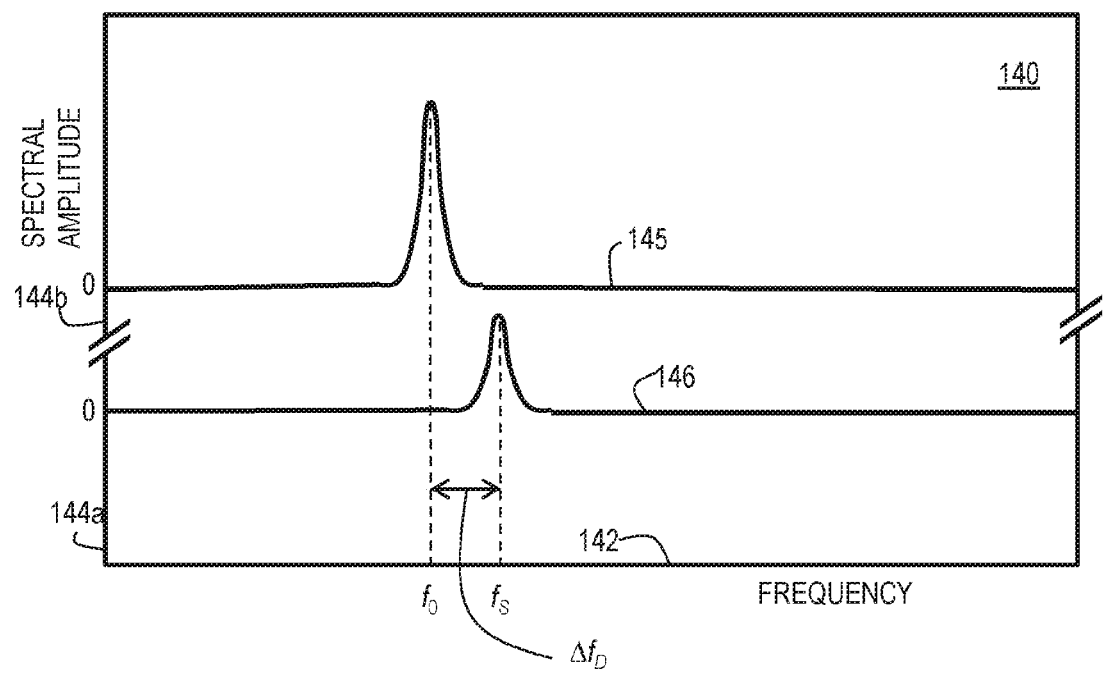
FIG. 1B is a schematic graph that illustrates an example spectrum of the reference signal and an example spectrum of a Doppler shifted return signal, according to an implementation.

The Doppler shift can be determined in the electrical processing of the returned signal, and the Doppler shift can be used to correct the cross correlation calculation. Thus, a peak can be more readily found and range can be more readily determined. FIG. 1B is a schematic graph 140 that illustrates an example spectrum of the transmitted signal and an example spectrum of a Doppler shifted complex return signal, according to an implementation. The horizontal axis 142 indicates RF frequency offset from an optical carrier fc in arbitrary units. The vertical axis 144a indicates amplitude of a particular narrow frequency bin, also called spectral density, in arbitrary units relative to zero. The vertical axis 144b indicates spectral density in arbitrary units relative to zero and is offset from axis 144a to separate traces. Trace 145 represents a transmitted signal; and, a peak occurs at the proper RF $f_0$. Trace 146 represents an idealized (noiseless) complex return signal that is backscattered from an object that is moving toward the LIDAR system and is therefore Doppler shifted to a higher frequency (called blue shifted). The return does not have a peak at the proper RF $f_0$; but, instead, is blue shifted by $\Delta f_D$ to a shifted frequency $f_S$. In practice, a complex return representing both in-phase and quadrature (I/Q) components of the return is used to determine the peak at $+\Delta f_D$, thus the direction of the Doppler shift, and the direction of motion of the target on the vector between the sensor and the object, can be detected from a single return.

Figure 1C:
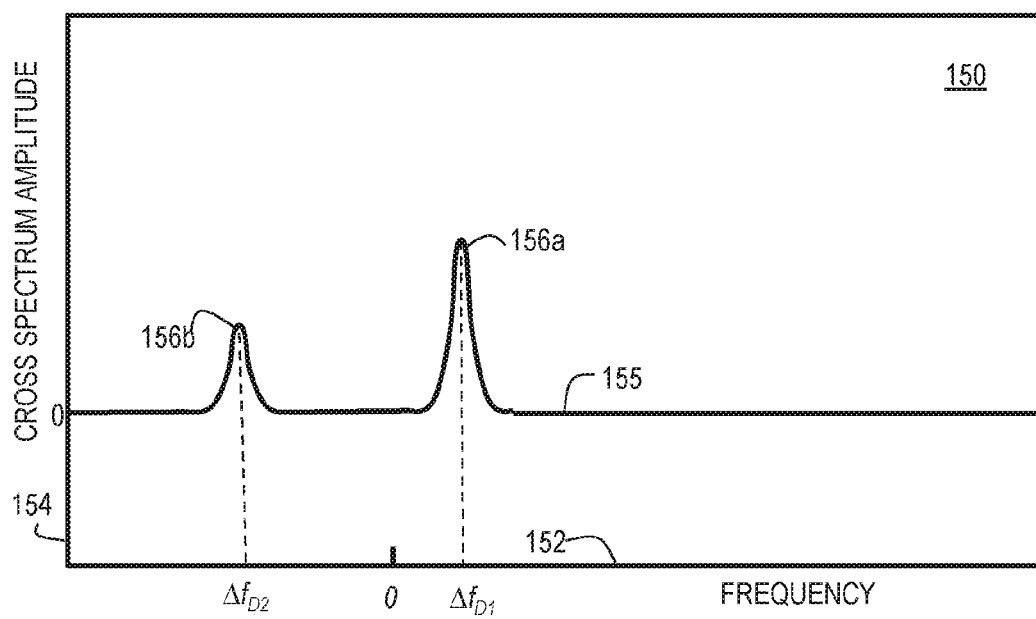
FIG. 1C is a schematic graph that illustrates an example cross-spectrum of phase components of a Doppler shifted return signal, according to an implementation.

In some Doppler compensation implementations, rather than finding $\Delta f_D$ by taking the spectrum of both transmitted and returned signals and searching for peaks in each, then subtracting the frequencies of corresponding peaks, as illustrated in FIG. 1B, it can more efficient to take the cross spectrum of the in-phase and quadrature component of the down-mixed returned signal in the RF band. FIG. 1C is a schematic graph 150 that illustrates an example cross-spectrum, according to an implementation. The horizontal axis 152 indicates frequency shift in arbitrary units relative to the reference spectrum; and, the vertical axis 154 indicates amplitude of the cross spectrum in arbitrary units relative to zero. Trace 155 represents a cross spectrum with an idealized (noiseless) return signal generated by one object moving toward the LIDAR system (blue shift of $\Delta f_{D1} = \Delta f_D$ in FIG. 1B) and a second object moving away from the LIDAR system (red shift of $\Delta f_{D2}$). A peak 156a occurs when one of the components is blue shifted $\Delta f_{D1}$; and, another peak 156b occurs when one of the components is red shifted $\Delta f_{D2}$. Thus, the Doppler shifts are determined. These shifts can be used to determine a signed velocity of approach of objects in the vicinity of the LIDAR, such as for collision avoidance applications. However, if I/Q processing is not done, peaks may appear at both $+/-\Delta f_{D1}$ and both $+/-\Delta f_{D2}$, so there may be ambiguity on the sign of the Doppler shift and thus the direction of movement.

The Doppler shift(s) detected in the cross spectrum can be used to correct the cross correlation so that the peak 135 is apparent in the Doppler compensated Doppler shifted return at lag $\Delta t$, and range R can be determined. In some implementations, simultaneous I/Q processing can be performed. In some implementations, serial I/Q processing can be used to determine the sign of the Doppler return. In some implementations, errors due to Doppler shifting can be tolerated or ignored; and, no Doppler correction is applied to the range measurements.

2. Chirped Detection Overview

Figure 1D:
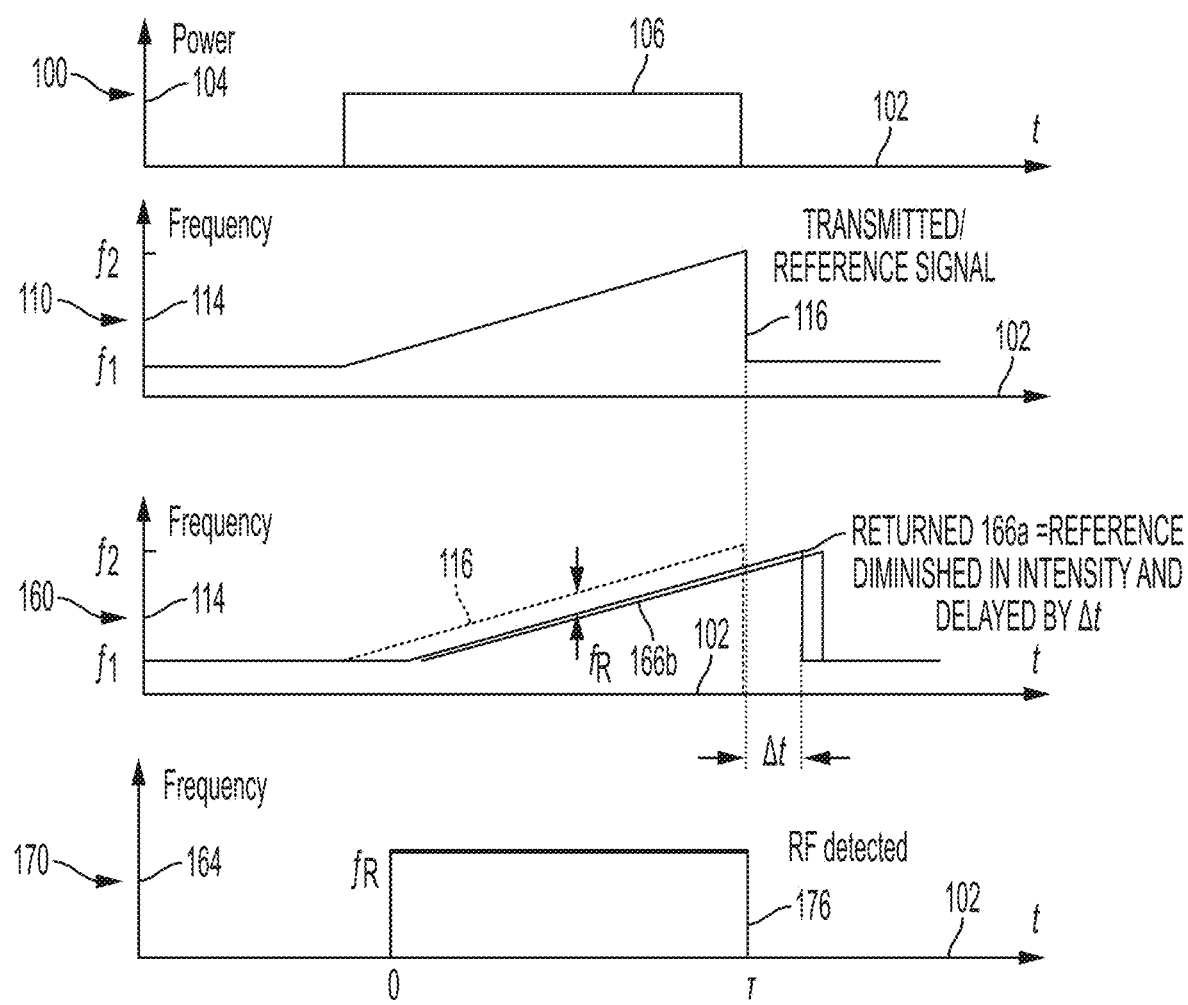
FIG. 1D is a set of graphs that illustrates an example optical chirp measurement of range, according to an implementation.

FIG. 1D is a set of graphs that illustrates an example optical chirp measurement of range, according to an implementation. The horizontal axis 102 is the same for all four graphs and indicates time in arbitrary units, on the order of milliseconds (ms, 1 ms=$10^{-3}$ seconds). Graph 100 indicates the power of a beam of light used as a transmitted optical signal. The vertical axis 104 in graph 100 indicates power of the transmitted signal in arbitrary units. Trace 106 indicates that the power is on for a limited pulse duration, $\tau$ starting at time $\kappa$. Graph 110 indicates the frequency of the transmitted signal. The vertical axis 114 indicates the frequency transmitted in arbitrary units. The trace 116 indicates that the frequency of the pulse increases from $f_1$ to $f_2$ over the duration $\tau$ of the pulse, and thus has a bandwidth $B = f_2 - f_1$. The frequency rate of change is $(f_2 - f_1)/\tau$.

The returned signal is depicted in graph 160 which has a horizontal axis 102 that indicates time and a vertical axis 114 that indicates frequency as in graph 110. The chirp (e.g., trace 116) of graph 110 is also plotted as a dotted line on graph 160. A first returned signal is given by trace 166a, which can represent the transmitted reference signal diminished in intensity (not shown) and delayed by $\Delta t$. When the returned signal is received from an external object after covering a distance of 2R, where R is the range to the target, the returned signal start at the delayed time $\Delta t$ can be given by 2R/c, where c is the speed of light in the medium (approximately $3 \times 10^8$ meters per second, m/s), related according to Equation 3, described above. Over this time, the frequency has changed by an amount that depends on the range, called $f_R$, and given by the frequency rate of change multiplied by the delay time. This is given by Equation 4a.

$$f_R = (f_2 - f_1)/\tau * R/c = 2BR/c\tau \tag{4a}$$

The value of $f_R$ can be measured by the frequency difference between the transmitted signal 116 and returned signal 166a in a time domain mixing operation referred to as de-chirping. So, the range R is given by Equation 4b.

$$R = f_R c \tau / 2B \tag{4b}$$

If the returned signal arrives after the pulse is completely transmitted, that is, if 2R/c is greater than τ, then Equations 4a and 4b are not valid. In this case, the reference signal can be delayed a known or fixed amount to ensure the returned signal overlaps the reference signal. The fixed or known delay time of the reference signal can be multiplied by the speed of light, c, to give an additional range that is added to range computed from Equation 4b. While the absolute range may be off due to uncertainty of the speed of light in the medium, this is a near-constant error and the relative ranges based on the frequency difference are still very precise.

In some circumstances, a spot illuminated (pencil beam cross section) by the transmitted light beam encounters two or more different scatterers at different ranges, such as a front and a back of a semitransparent object, or the closer and farther portions of an object at varying distances from the LIDAR, or two separate objects within the illuminated spot. In such circumstances, a second diminished intensity and differently delayed signal will also be received, indicated on graph 160 by trace 166b. This will have a different measured value of $f_R$ that gives a different range using Equation 4b. In some circumstances, multiple additional returned signals are received.

Graph 170 depicts the difference frequency $f_R$ between a first returned signal 166a and the reference chirp 116. The horizontal axis 102 indicates time as in all the other aligned graphs in FIG. 1D, and the vertical axis 164 indicates frequency difference on a much expanded scale. Trace 176 depicts the constant frequency $f_R$ measured in response to the transmitted chirp, which indicates a particular range as given by Equation 4b. The second returned signal 166b, if present, would give rise to a different, larger value of $f_R$ (not shown) during de-chirping; and, as a consequence yield a larger range using Equation 4b.

De-chirping can be performed by directing both the reference optical signal and the returned optical signal to the same optical detector. The electrical output of the detector may be dominated by a beat frequency that is equal to, or otherwise depends on, the difference in the frequencies of the two signals converging on the detector. A Fourier transform of this electrical output signal will yield a peak at the beat frequency. This beat frequency is in the radio frequency (RF) range of Megahertz (MHz, 1 MHz=$10^6$ Hertz=$10^6$ cycles per second) rather than in the optical frequency range of Terahertz (THz, 1 THz=$10^{12}$ Hertz). Such signals can be processed by RF components, such as a Fast Fourier Transform (FFT) algorithm running on a microprocessor or a specially built FFT or other digital signal processing (DSP) integrated circuit. The return signal can be mixed with a continuous wave (CW) tone acting as the local oscillator (versus a chirp as the local oscillator). This leads to the detected signal which itself is a chirp (or whatever waveform was transmitted). In this case the detected signal can undergo matched filtering in the digital domain, though the digitizer bandwidth requirement may generally be higher. The positive aspects of coherent detection are otherwise retained.

In some implementations, the LIDAR system is changed to produce simultaneous up and down chirps. This approach can eliminate variability introduced by object speed differences, or LIDAR position changes relative to the object which actually does change the range, or transient scatterers in the beam, among others, or some combination. The approach may guarantee that the Doppler shifts and ranges measured on the up and down chirps are indeed identical and can be most usefully combined. The Doppler scheme may guarantee parallel capture of asymmetrically shifted return pairs in frequency space for a high probability of correct compensation.

Figure 1E:
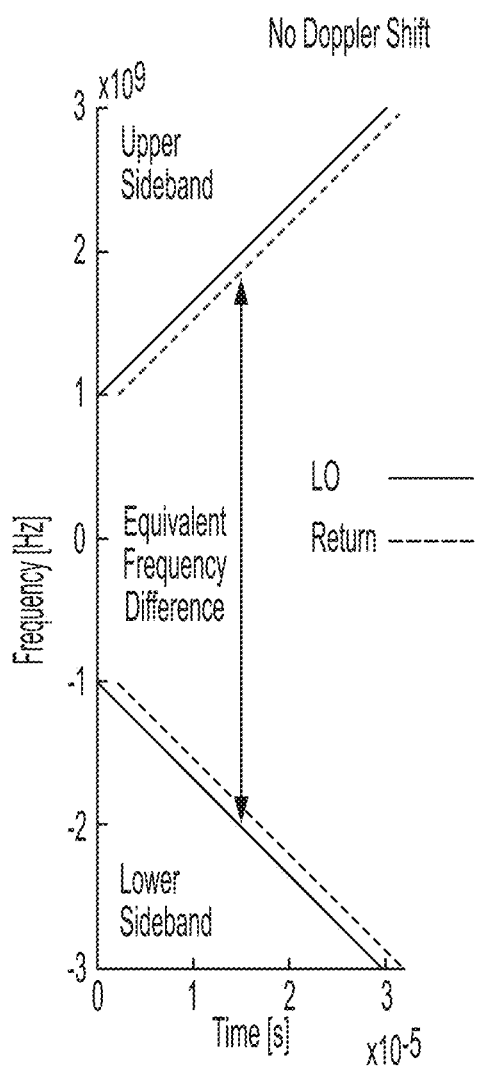
FIG. 1E is a graph using a symmetric LO signal, and shows the return signal in this frequency time plot as a dashed line when there is no Doppler shift, according to an implementation.

FIG. 1E is a graph using a symmetric LO signal and shows the return signal in this frequency time plot as a dashed line when there is no Doppler shift, according to an implementation. The horizontal axis indicates time in example units of $10^{-5}$ seconds (tens of microseconds). The vertical axis indicates frequency of the optical transmitted signal relative to the carrier frequency $f_c$ or reference signal in example units of GigaHertz ($10^9$ Hertz). During a pulse duration, a light beam comprising two optical frequencies at any time is generated. One frequency increases from $f_1$ to $f_2$ (e.g., 1 to 2 GHz above the optical carrier) while the other frequency simultaneous decreases from $f_4$ to $f_3$ (e.g., 1 to 2 GHz below the optical carrier). The two frequency bands e.g., band 1 from $f_1$ to $f_2$, and band 2 from $f_3$ to $f_4$) do not overlap so that both transmitted and return signals can be optically separated by a high pass or a low pass filter, or some combination, with pass bands starting at pass frequency $f_p$. For example $f_1<f_2<f_p<f_3<f_4$. As illustrated, the higher frequencies can provide the up chirp and the lower frequencies can provide the down chirp. In some implementations, the higher frequencies produce the down chirp and the lower frequencies produce the up chirp.

In some implementations, two different laser sources are used to produce the two different optical frequencies in each beam at each time. In some implementations, a single optical carrier is modulated by a single RF chirp to produce symmetrical sidebands that serve as the simultaneous up and down chirps. In some implementations, a double sideband Mach-Zehnder intensity modulator is used that, in general, may not leave much energy in the carrier frequency; instead, almost all of the energy goes into the sidebands.

As a result of sideband symmetry, the bandwidth of the two optical chirps can be the same if the same order sideband is used. In some implementations, other sidebands are used, e.g., two second order sideband are used, or a first order sideband and a non-overlapping second sideband is used, or some other combination.

When selecting the transmit (TX) and local oscillator (LO) chirp waveforms, it can be advantageous to ensure that the frequency shifted bands of the system take maximum advantage of available digitizer bandwidth. In general, this is accomplished by shifting either the up chirp or the down chirp to have a range frequency beat close to zero.

Figure 1F:
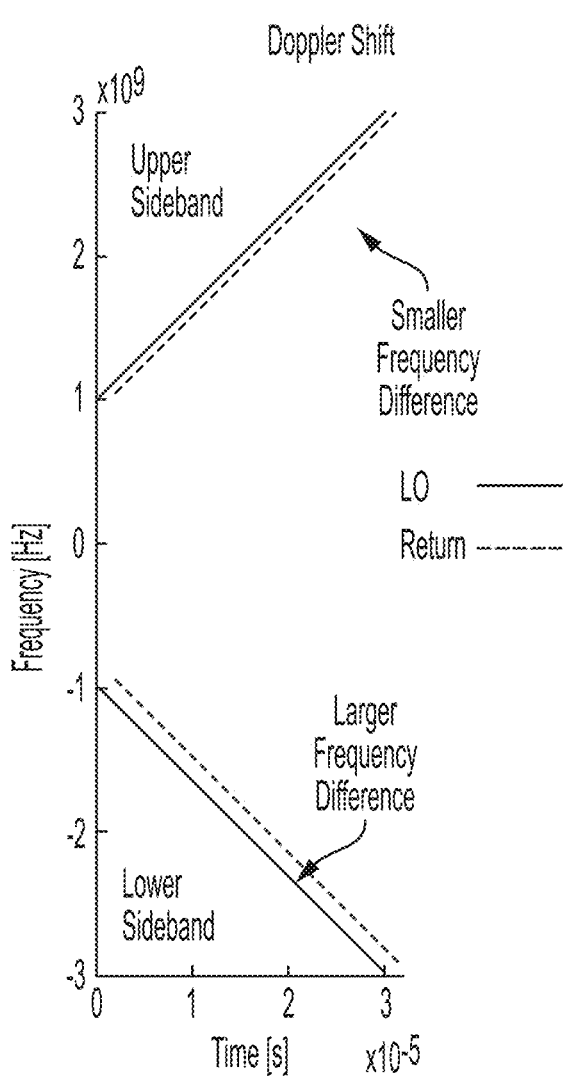
FIG. 1F is a graph similar to FIG. 1E, using a symmetric LO signal, and shows the return signal in this frequency time plot as a dashed line when there is a non zero Doppler shift, according to an implementation.

FIG. 1F is a graph similar to FIG. 1E, using a symmetric LO signal, and shows the return signal in this frequency time plot as a dashed line when there is a nonzero Doppler shift. In the case of a chirped waveform, the time separated I/Q processing (aka time domain multiplexing) can be used to overcome hardware requirements of other approaches. In that case, an AOM can be used to break the range-Doppler ambiguity for real valued signals. In some implementations, a scoring system can be used to pair the up and down chirp returns. In some implementations, I/Q processing can be used to determine the sign of the Doppler chirp.

3. Optical Detection Hardware Overview

FIG. 2A is a block diagram that illustrates example components of a high resolution range LIDAR system 200, according to an implementation. Optical signals are indicated by arrows. Electronic wired or wireless connections are indicated by segmented lines without arrowheads. A laser source 212 emits a beam (e.g., carrier wave 201) that is phase or frequency modulated in modulator 282a, before or after splitter 216, to produce a phase coded or chirped optical signal 203 that has a duration D. A splitter 216 splits the modulated (or, as shown, the unmodulated) optical signal for use in a reference path 220. A target beam 205, also called transmitted signal herein, with most of the energy of the beam 201 can be produced. A modulated or unmodulated reference beam 207a, which can have a much smaller amount of energy that is nonetheless enough to produce good mixing with the returned light 291 scattered from an object (not shown), can also be produced. As depicted in FIG. 2A, the reference beam 207a is separately modulated in modulator 282b. The reference beam 207a passes through reference path 220 and is directed to one or more detectors as reference beam 207b. In some implementations, the reference path 220 introduces a known delay sufficient for reference beam 207b to arrive at the detector array 230 with the scattered light from an object outside the LIDAR within a spread of ranges of interest. In some implementations, the reference beam 207b is called the local oscillator (LO) signal, such as if the reference beam 207b were produced locally from a separate oscillator. In various implementations, from less to more flexible approaches, the reference beam 207b can be caused to arrive with the scattered or reflected field by: 1) putting a mirror in the scene to reflect a portion of the transmit beam back at the detector array so that path lengths are well matched; 2) using a fiber delay to closely match the path length and broadcast the reference beam with optics near the detector array, as suggested in FIG. 2A, with or without a path length adjustment to compensate for the phase or frequency difference observed or expected for a particular range; or, 3) using a frequency shifting device (acousto-optic modulator) or time delay of a local oscillator waveform modulation (e.g., in modulator 282b) to produce a separate modulation to compensate for path length mismatch; or some combination. In some implementations, the object is close enough and the transmitted duration long enough that the returns sufficiently overlap the reference signal without a delay.

The transmitted signal is then transmitted to illuminate an area of interest, such as through one or more scanning optics 218. The detector array can be a single paired or unpaired detector or a 1 dimensional (1D) or 2 dimensional (2D) array of paired or unpaired detectors arranged in a plane roughly perpendicular to returned beams 291 from the object. The reference beam 207b and returned beam 291 can be combined in zero or more optical mixers 284 to produce an optical signal of characteristics to be properly detected. The frequency, phase or amplitude of the interference pattern, or some combination, can be recorded by acquisition system 240 for each detector at multiple times during the signal duration D. The number of temporal samples processed per signal duration or integration time can affect the down-range extent. The number or integration time can be a practical consideration chosen based on number of symbols per signal, signal repetition rate and available camera frame rate. The frame rate is the sampling bandwidth, often called "digitizer frequency." The only fundamental limitations of range extent are the coherence length of the laser and the length of the chirp or unique phase code before it repeats (for unambiguous ranging). This is enabled because any digital record of the returned heterodyne signal or bits could be compared or cross correlated with any portion of transmitted bits from the prior transmission history.

The acquired data is made available to a processing system 250, such as a computer system described below with reference to FIG. 7, or a chip set described below with reference to FIG. 8. A scanner control module 270 provides scanning signals to drive the scanning optics 218. The scanner control module 270 can include instructions to perform one or more steps of the method 600 related to the flowchart of FIG. 6. A signed Doppler compensation module (not shown) in processing system 250 can determine the sign and size of the Doppler shift and the corrected range based thereon along with any other corrections. The processing system 250 can include a modulation signal module (not shown) to send one or more electrical signals that drive modulators 282a, 282b. In some implementations, the processing system also includes a vehicle control module 272 to control a vehicle on which the system 200 is installed.

Optical coupling to flood or focus on a target or focus past the pupil plane are not depicted. As used herein, an optical coupler is any component that affects the propagation of light within spatial coordinates to direct light from one component to another component, such as a vacuum, air, glass, crystal, mirror, lens, optical circulator, beam splitter, phase plate, polarizer, optical fiber, optical mixer, among others, alone or in some combination.

FIG. 2A also illustrates example components for a simultaneous up and down chirp LIDAR system according to an implementation. As depicted in FIG. 2A, the modulator 282a can be a frequency shifter added to the optical path of the transmitted beam 205. In some implementations, the frequency shifter is added to the optical path of the returned beam 291 or to the reference path 220. The frequency shifter can be added as modulator 282b on the local oscillator (LO, also called the reference path) side or on the transmit side (before the optical amplifier) as the device used as the modulator (e.g., an acousto-optic modulator, AOM) has some loss associated and it can be disadvantageous to put lossy components on the receive side or after the optical amplifier. The optical shifter can shift the frequency of the transmitted signal (or return signal) relative to the frequency of the reference signal by a known amount $\Delta f_S$, so that the beat frequencies of the up and down chirps occur in different frequency bands, which can be picked up, e.g., by the FFT component in processing system 250, in the analysis of the electrical signal output by the optical detector 230. For example, if the blue shift causing range effects is $f_B$, then the beat frequency of the up chirp will be increased by the offset and occur at $f_B + \Delta f_S$ and the beat frequency of the down chirp will be decreased by the offset to $f_B - \Delta f_S$. Thus, the up chirps will be in a higher frequency band than the down chirps, thereby separating them. If $\Delta f_S$ is greater than any expected Doppler effect, there will be no ambiguity in the ranges associated with up chirps and down chirps. The measured beats can then be corrected with the correctly signed value of the known $\Delta f_S$ to get the proper up-chirp and down-chirp ranges. In some implementations, the RF signal coming out of the balanced detector is digitized directly with the bands being separated via FFT. In some implementations, the RF signal coming out of the balanced detector is pre-processed with analog RF electronics to separate a low-band (corresponding to one of the up chirp or down chip) which can be directly digitized and a high-band (corresponding to the opposite chirp) which can be electronically down-mixed to baseband and then digitized. Various such implementations offer pathways that match the bands of the detected signals to available digitizer resources. In some implementations, the modulator 282a is excluded (e.g. direct ranging).

Figure 2B:
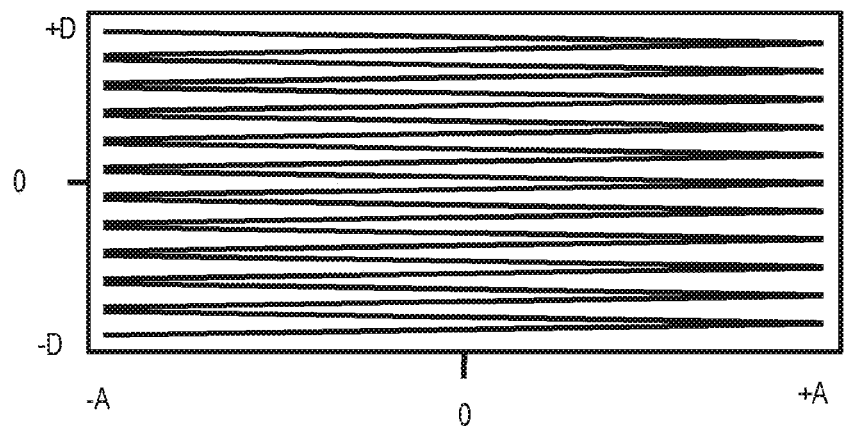
FIG. 2B is a block diagram that illustrates a saw tooth scan pattern for a hi-res Doppler system, used in some implementations.
Figure 2C:
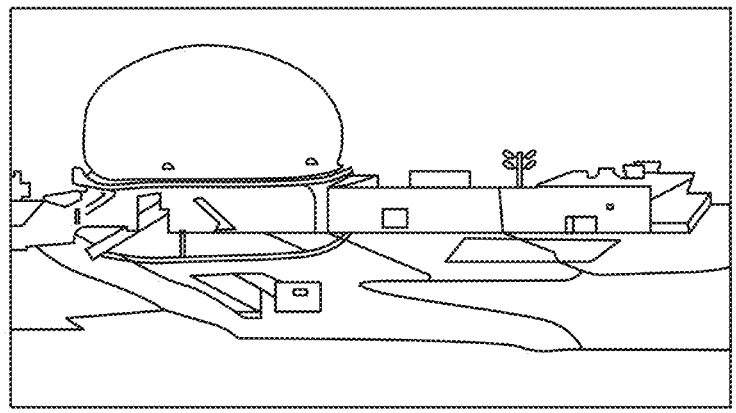
FIG. 2C is an image that illustrates an example speed point cloud produced by a hi-res Doppler LIDAR system, according to an implementation.

FIG. 2B is a block diagram that illustrates a saw tooth scan pattern for a hi-res Doppler system. The scan sweeps through a range of azimuth angles (e.g. horizontally along axis 222) and inclination angles (e.g. vertically along axis 224 above and below a level direction at zero inclination). Various can patterns can be used, including adaptive scanning. FIG. 2C is an image that illustrates an example speed point cloud produced by a hi-res Doppler LIDAR system.

Figure 2D:
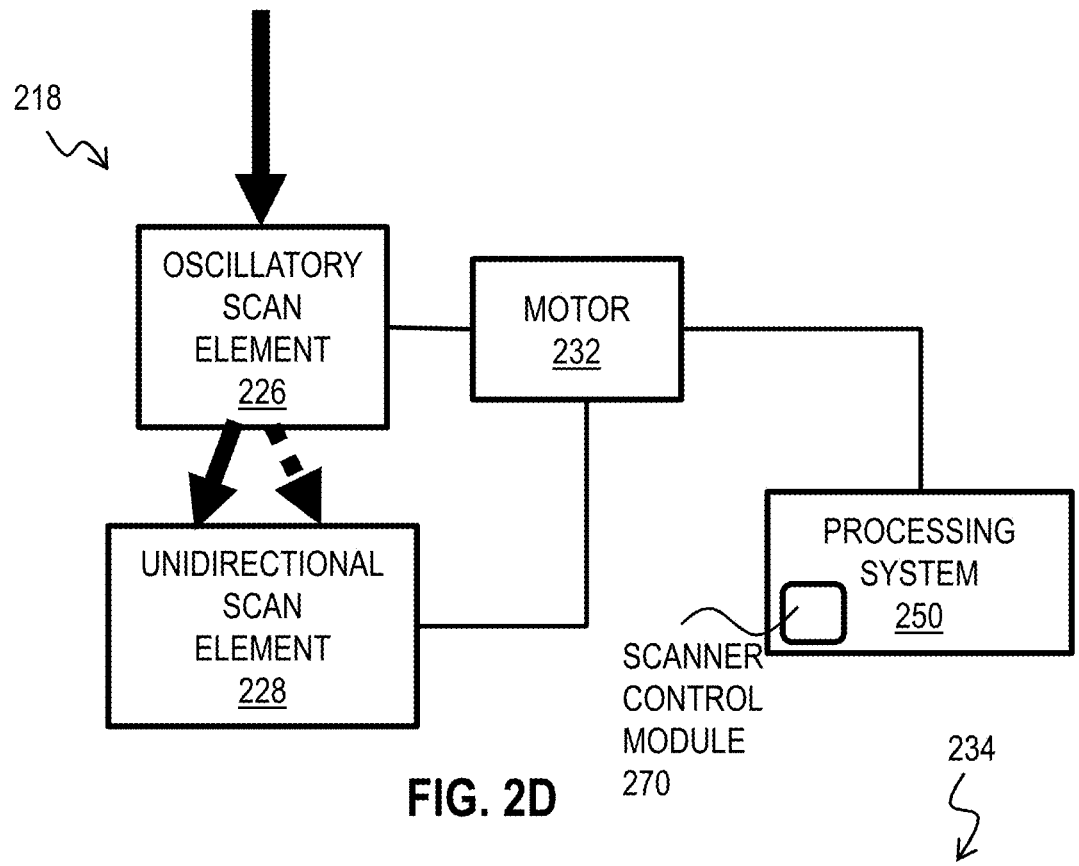
FIG. 2D is a block diagram that illustrates example components of the scanning optics of the system of FIG. 2A, according to an implementation.

FIG. 2D is a block diagram that illustrates example components of the scanning optics 218 of the system 200 of FIG. 2A. In an implementation, the scanning optics 218 is a two-element scan system including an oscillatory scan element 226 that controls actuation of the beam 205 along one axis (e.g. between angles −A and +A along axis 222 of FIG. 2B) and a unidirectional constant speed scan element 228 (e.g. polygon deflector) that controls actuation of the beam 205 in one direction along another axis (e.g. along axis 224 of FIG. 2B). The scanning optics 218 can be used in the system 200 of FIG. 2A. The scanning optics 218 can be used in systems other than LIDAR systems such as the system 200, including laser etching, surface treatment, barcode scanning, and refractive scanning of a beam. In some implementations, the oscillatory scan element 226 is provided without the unidirectional scan element 228 or in other implementations, the unidirectional scan element 228 is provided without the oscillatory scan element 226. In an implementation, the oscillatory scan element 226 actuates the beam 205 in opposing directions along the axis 222 between the angles −A and +A as the unidirectional constant speed scan element 228 simultaneously actuates the beam 205 in one direction along the axis 224. In an implementation, the actuation speed of the oscillatory scan element 226 is bi-directional and greater than the unidirectional actuation speed of the constant speed scan element 228, so that the beam 205 is scanned along the axis 222 (e.g. between angles −A to +A) back and forth multiple times for each instance that the beam is scanned along the axis 224 (e.g. from angle =D to +D).

In some implementations, the scanner control module 270 provides signals that are transmitted from the processing system 250 to a motor 232 that is mechanically coupled to the oscillatory scan element 226 and/or the unidirectional scan element 228. In an implementation, two motors are provided where one motor is mechanically coupled to the oscillatory scan element 226 and another motor is mechanically coupled to the unidirectional scan element 228. In an implementation, based on the signals received from the processing system 250, the motor 232 rotates the oscillatory scan element 226 and/or the unidirectional scan element 228 based on a value of a parameter (e.g. angular speed, etc.) in the signal. The scanner control module 270 can determine the value of the parameter in the signal so that the beam 205 is scanned by the oscillatory scan element 226 by a desired scan pattern (e.g. between angles −A to +A along axis 222) and/or by the unidirectional constant speed scan element 228 in a desired scan pattern (e.g. between angles =D to +D along axis 224).

4. Coherent LIDAR System for Refractive Beam-Steering

Figure 3:
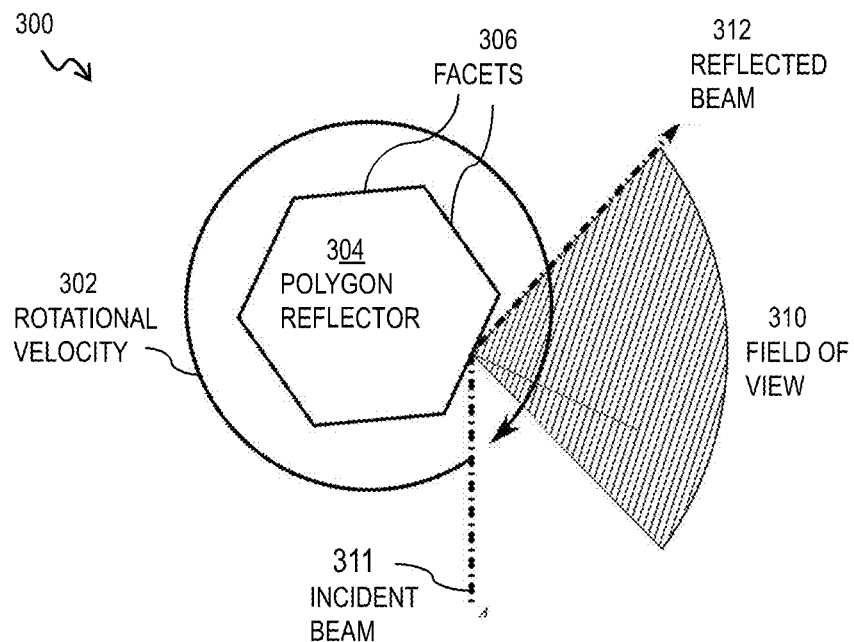
FIG. 3 is a block diagram that illustrates an example of a conventional assembly including a polygon reflector rotated by a motor to reflect an incident beam over a field of view.

FIG. 3 is a block diagram that illustrates an example of an assembly 300 including a polygon reflector 304 rotated by a motor (not shown) to reflect an incident beam 311 over a field of view 310 (e.g. between a first and second angle within the plane of FIG. 3). The polygon reflector 304 includes a plurality of reflective facets 306 (e.g. six in a hexagon reflector). Each facet 306 reflects the incident beam 311 into a reflected beam 312 which defines the field of view 310 as the reflector 304 rotates about a rotation axis. The field of view 310 can be defined when the incident beam 311 encounters a first and second break in the facet 306. The field of view 310 can be limited by the position of the incident beam 311 that is co-planar with the facet 306, since the field of view 310 cannot encompass angles coinciding with the incident beam 311. The field of view 310 cannot encompass the incident beam 311 since no useful return beam data can be gathered for those scan angles. Thus, the polygon reflector 304 has a limited field of view 310 due to the nature of the incident beam 311 that is coplanar and incident on the exterior surface of the facet 306. This field of view 310 can limit a duty cycle of the polygon reflector 304, which is defined as a time that the facets 306 reflect the beam 312 over the field of view 310 to a total time of operation of the assembly 300. This duty cycle may be about 50% with conventional polygon reflectors 304.

Figure 4:
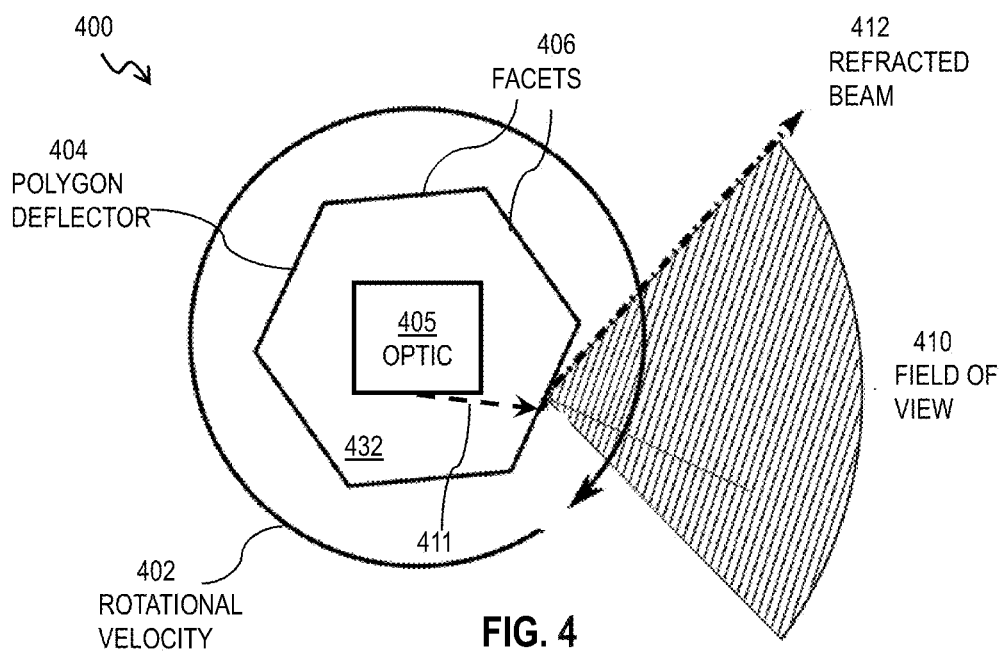
FIG. 4 is a block diagram that illustrates an example of an assembly including a polygon deflector rotated by a motor to refract an incident beam from an interior of the deflector, according to an implementation.

FIG. 4 is a block diagram that illustrates an example of an assembly 400 including a polygon deflector 404 rotated by a motor 232 to deflect (e.g. refract) an incident beam 411 from an interior 432 of the deflector 404. The polygon deflector 404 can include the unidirectional constant speed scan element 228, which may or may not be used in the system 200 of FIG. 2A. The incident beam 411 can be shaped (e.g., collimated) by an optic 405 (e.g. one or more lenses or mirrors) positioned within an interior 432 of the polygon deflector 404. The incident beam 411 can be directed to the interior 432 from outside the polygon deflector 404 before it is shaped by the optic 405 within the interior 432. In some implementations, a plurality of incident beams 411 are provided and shaped by the optic 405 before being directed at the facet 406. The facet 406 can refract the incident beam 411 as the refracted beam 412 based on Snell's law, according to the index of refraction of the facet 406 and angle of incidence of the beam 411 on the facet 406. In an implementation, the field of view 410 is defined by the refracted beam 412 between facet breaks of the incident beam 411 on a first facet 406. In an implementation, the field of view 410 is greater than the field of view 310 in the polygon reflector 304. In an implementation, the field of view 410 is about 90 degrees (e.g. polygon deflector 404 made from high index material such as Silicon) or about 50 degrees (e.g. polygon deflector 404 made from non-exotic material) as compared with the field of view 310 which is less than or about 90 degrees. In an implementation, a width of the polygon deflector 404 (e.g. defined as a distance between opposing facets 406) is about the same as a width of the polygon reflector 304 (e.g. defined as a distance between opposing facets 306) and a width of each facet 406 is about the same as a width of each facet 306. Thus, the savings in space of the assembly 400 as compared to the assembly 300 can be due to the assembly 400 not requiring external components of the assembly 300 (e.g. collimator to direct the incident beam 311) relative to the polygon deflector 404. In an implementation, the polygon deflector 404 has a width of about 70 mm (e.g. measured between facets 406 on opposite sides of the deflector 404) and about 44 mm length along each facet 406. In an implementation, the polygon reflector 304 has similar dimensions as the polygon deflector 404 but has an additional collimator (e.g. to direct the incident beam 311) measuring about 50 mm and spaced about 25 mm from the polygon reflector 304. Thus, the front area length of the polygon deflector 404 is about 70 mm as compared to the polygon reflector 304 which is about 140 mm. In an implementation, the incident beam 411 is continuously refracted over the field of view 410 by each facet 406 as the polygon deflector 404 is rotated by the motor 232. In an implementation, the duty cycle of the polygon deflector 404 is greater than 50% and/or greater than about 70% and/or about 80%. The duty cycle can be based on a ratio of a first time based on refraction of the incident beam 411 to a second time based on rotation of the polygon deflector 404 and shaping of the incident beam 411.

Figure 5A:
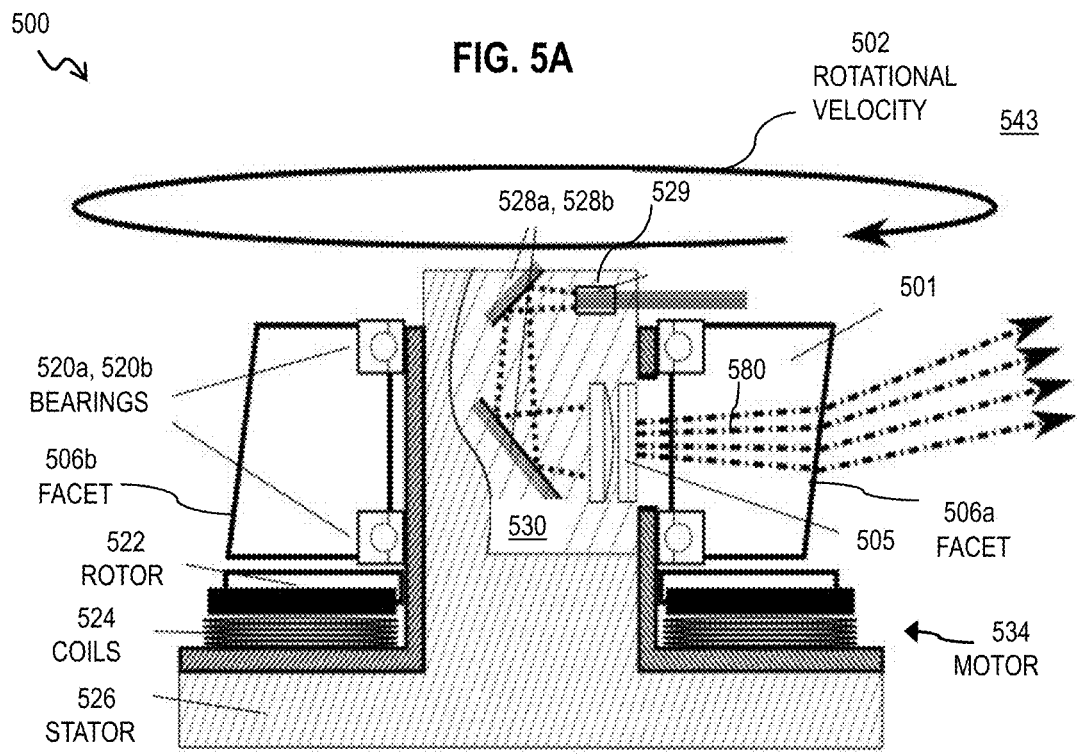
FIG. 5A is a schematic diagram that illustrates an example of a cross-sectional side view of an assembly including a polygon deflector rotated by a motor to refract an incident beam from an interior of the deflector, according to an implementation.
Figure 5B:
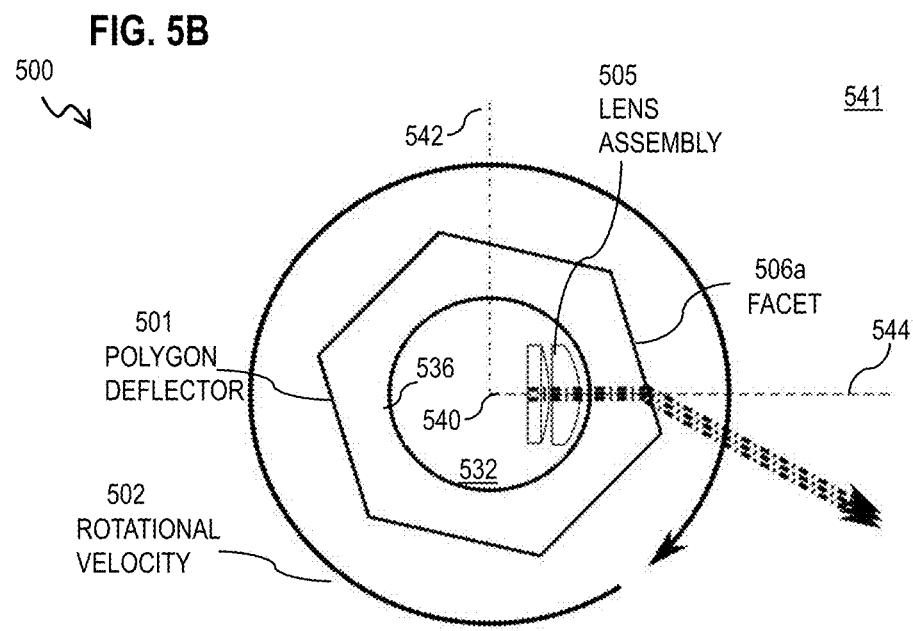
FIG. 5B is a schematic diagram that illustrates an example of a cross-sectional top view of the polygon deflector of FIG. 5A, according to an implementation.

FIG. 5A is a schematic diagram that illustrates an example of a cross-sectional side view of an assembly 500 including a polygon deflector 501 rotated by a motor 534 to refract an incident beam 580 from an interior 532 of the deflector 501. FIG. 5B is a schematic diagram that illustrates an example of a cross-sectional top view of the polygon deflector 501 of FIG. 5A. In an implementation, the polygon deflector 501 includes a plurality of facets 506. In an implementation, the polygon deflector 501 is made from material that is transmissive or has high transmission characteristics (e.g. above 90%) at a wavelength of the beam 580. Although FIGS. 5A-5B depict a hexagon deflector (e.g. six sides), various implementations are not limited to a hexagon deflector and may include any polygon deflector with any number of facets and need not be a regular polygon with equal angles and equal width of the facets 506 but may be an irregular polygon with unequal angles or unequal widths of the facets 506, for example.

The polygon deflector 501 can be rotatably coupled to a motor 534. In an implementation, the motor 534 rotates the polygon deflector 501 about a rotation axis 540. In an implementation, the rotation axis 540 is orthogonal to a first plane 541 (plane of FIG. 5B) in which the polygon deflector 501 rotates with a rotation velocity 502. Although FIGS. 5A-5B depict that the rotation velocity 502 is clockwise, the rotation velocity 502 can be counterclockwise. In an implementation, the magnitude of the rotation velocity is about 100 revolutions per minute (rpm) to about 1000 rpm and/or about 10 rpm to about 10,000 rpm. In some implementations, the magnitude of the rotation velocity can be an order of magnitude more than the numerical ranges disclosed herein. In an implementation, the motor 534 is a brushless DC (BLDC) motor that includes a plurality of bearings 520a, 520b rotatably coupled to an inner surface 536 of the polygon deflector 501 that defines the interior 532. The motor 534 can include a rotor 522 actuated by coils 524 to rotate the polygon deflector 501 about the rotation axis 540. The motor 534 can include a stator 526 that is partially positioned in the interior 532 of the polygon deflector 501 and defines a cavity 530 where optics are positioned to steer the incident beams 580 on the facet 506. The stator can output an electromagnetic field to drive the coils 524 to actuate the rotor 522. In an implementation, the motor 534 is a BLDC motor manufactured by Nidec® Corporation, Braintree Mass.

In an implementation, one or more optic are positioned in the interior 532 of the polygon deflector 501 to steer the incident beams 580 on the facet 506. In an implementation, the optics include a lens assembly 505 that includes one or more lenses and/or a pair of mirrors 528a, 528b. In an implementation, the lens assembly 505 is a free form toric single lens.

Figure 5C:
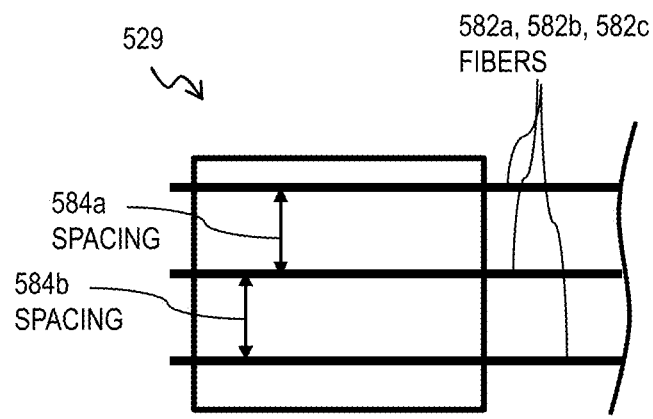
FIG. 5C is a schematic diagram that illustrates an example of a side view of a planar fiber array of the assembly of FIG. 5A, according to an implementation.
Figure 5D:
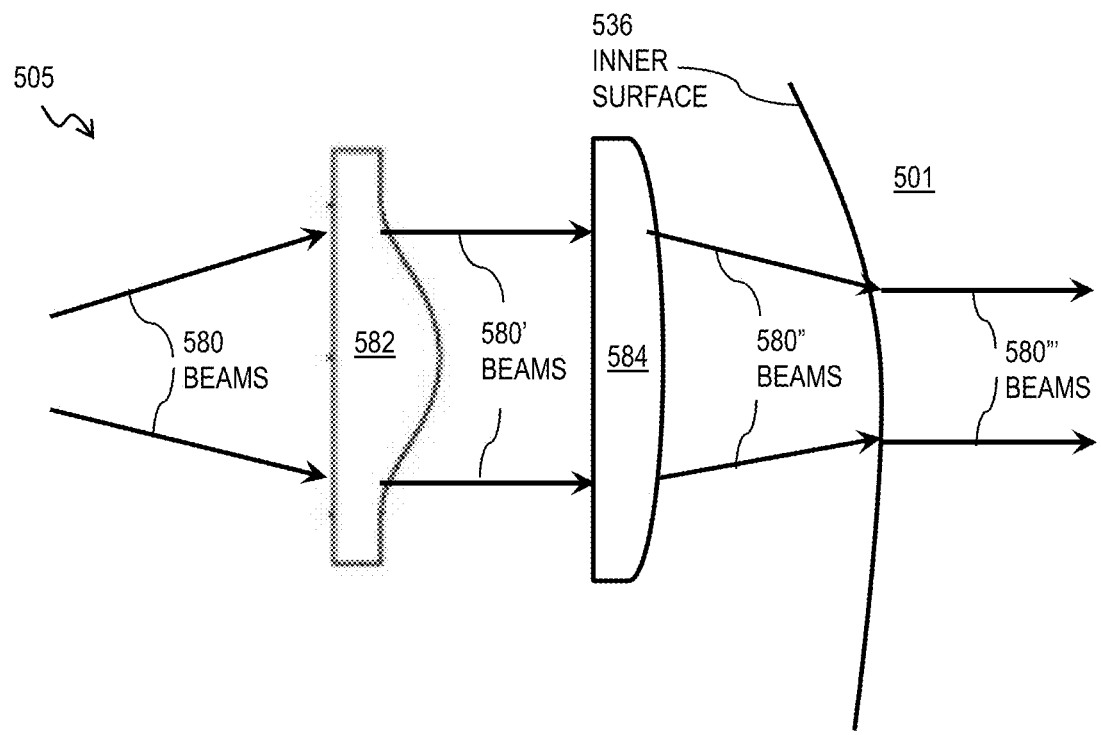
FIG. 5D is a schematic diagram that illustrates an example of a side view of a lens assembly of the assembly of FIG. 5A, according to an implementation.
Figure 5E:
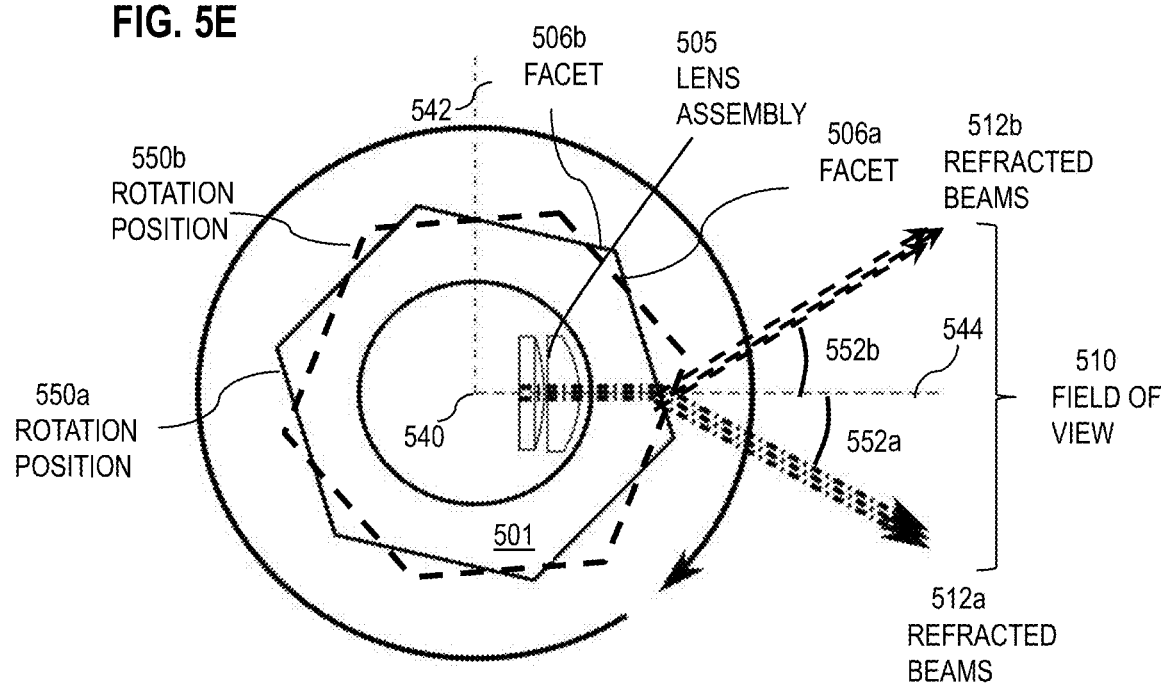
FIG. 5E is a schematic diagram that illustrates an example of the polygon deflector of FIG. 5B in two rotation positions, according to an implementation.
Figure 5F:
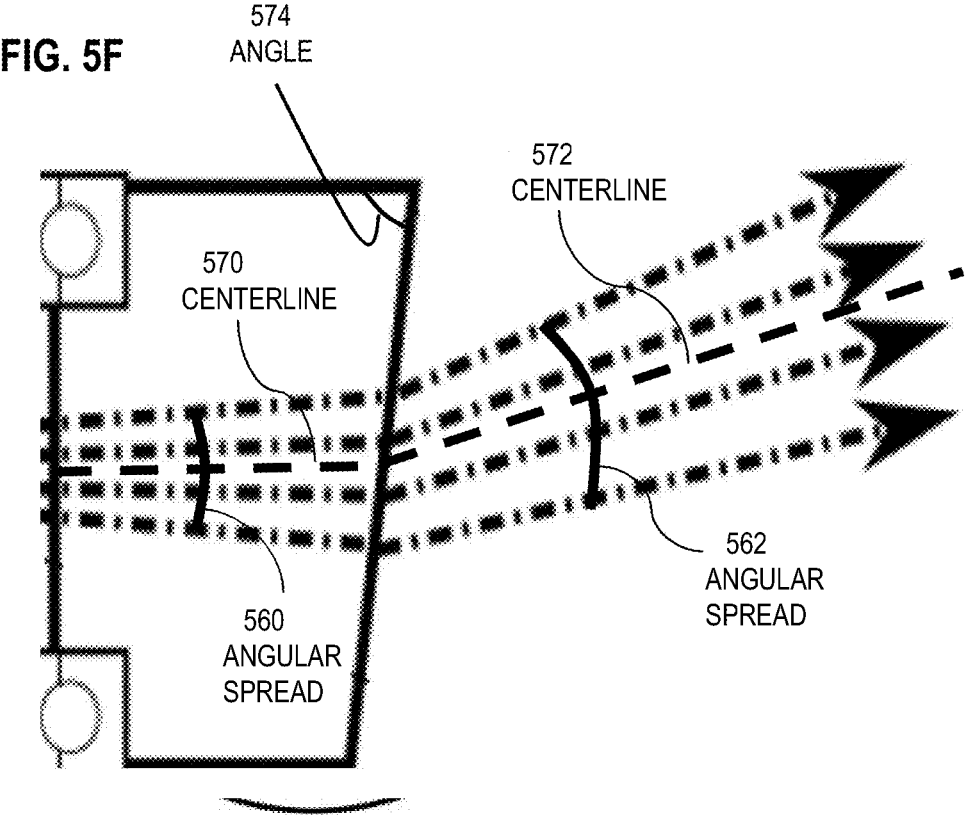
FIG. 5F is a schematic diagram that illustrates an example of a partial cross-sectional side view of the polygon deflector of FIG. 5A, according to an implementation.
Figure 5G:
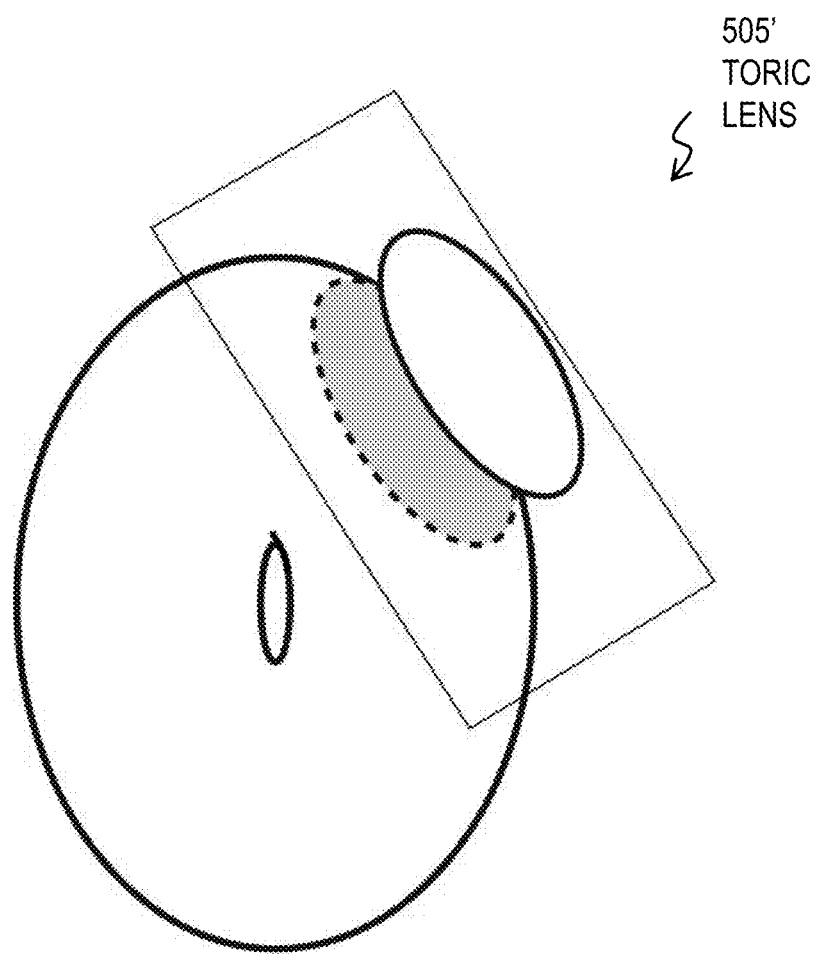
FIG. 5G is a schematic diagram that illustrates an example of a cut away cross-sectional view of a toric lens used in the assembly of FIG. 5A, according to an implementation.

FIG. 5G is a schematic diagram that illustrates an example of a cut away cross-sectional view of a single toric lens 505' used in the assembly 500 of FIG. 5A. In an implementation, the toric lens 505' is used in place of the lens assembly 505. In an implementation, the toric lens 505' is selected since it features some characteristics of a cylindrical lens and other characteristics of a spherical lens and/or is a hybrid lens in a shape of a doughnut that is an optical combination of the first and second lens of the lens assembly 505. In an implementation, software instructions of the module 270 can include one or more instructions to determine one or more parameter values of the toric lens 505' that is equivalent to the lens assembly 505. In an implementation, the beams 580 are transmitted to the interior 532 with a planar fiber array 529 that is mounted in a focal plane (e.g. plane 543 of FIG. 5A) of the lens assembly 505.

FIG. 5C is a schematic diagram that illustrates an example of a side view of a planar fiber array 529 of the assembly 500 of FIG. 5A, according to an implementation. In an implementation, FIG. 5C is taken along the same plane 543 as FIG. 5A (e.g. the focal plane of the lens assembly 505). In an implementation, the planar fiber array 529 includes a plurality of fibers 582a, 582b, 582c that are spaced apart by respective transverse spacing 584a, 584b. Although three fibers 582 are depicted in the planar fiber array 529 of FIG. 5C, this is merely one example and more or less than three fibers 582 can be provided in the planar fiber array 529. In some implementations, the transverse spacing 584a, 584b is equal between adjacent fiber pairs. In some implementations, the transverse spacing 584a, 584b is unequal between adjacent fiber pairs (e.g. the spacing 584a between fibers 582a, 582b is not the same as spacing 584b between fibers 582b, 582c). In an implementation, a respective beam 580 is transmitted from a tip of each fiber 582 and thus a plurality of beams 580 are transmitted within the interior 532 (e.g. the cavity 530 of the stator 526) from the tips of the fibers 582. In one example implementation, the planar fiber array 529 is a fixed spacing fiber array and planar lightwave circuit (PLC) connections, manufactured by Zhongshan Meisu Technology Company, Zhongshan, Guangdong Province, China.

As depicted in FIG. 5A, the plurality of beams 580 transmitted from the planar fiber array 529 can be reflected by a first mirror 528a to a second mirror 528b which in turn reflects the plurality of beams 580 to the lens assembly 505. In an implementation, the mirrors 528a, 528b are angled orthogonally to each other (e.g. 90 degrees or in a range from about 70 degrees to about 110 degrees) so that the beams 580 reflected by the mirror 528b are oriented in a direction that is about 180 degrees from the direction of the beams 580 incident on the mirror 528a. In an implementation, the second mirror 528b has a longer reflective surface than the first mirror 528a since the beams 580 cover a wider angular spread at the second mirror 528b than the first mirror 528a. In an example implementation, the mirrors 528 are manufactured by Edmunds® Optics of Barrington N.J.

FIG. 5D is a schematic diagram that illustrates an example of a side view of a lens assembly 505 of the assembly 500 of FIG. 5A, according to an implementation. In an implementation, FIG. 5D is taken along the plane 541 of FIG. 5B (e.g. orthogonal to the plane 543 of FIG. 5A). In an implementation, the lens assembly 505 includes a first lens 582 that collimates diverging beams 580 that are reflected to the first lens 582 from the second mirror 528b. In an implementation, the first lens 582 is an aspheric lens with a focal length that is selected so that the diverging beams 580 from the second mirror 528b are collimated by the aspheric lens. In an implementation, the focal length of the aspheric lens extends beyond the second mirror 528b.

As depicted in FIG. 5D, collimated beams 580' from the first lens 582 can be diverted by a second lens 584. In an implementation, where the second lens 584 is a positive cylindrical lens that converges the beams based on a focal length of the positive cylindrical lens. In an implementation, the converging beams 580" from the second lens 584 are refracted by the inner surface 536 of the polygon deflector 501 that defines the interior 532 so that the beams 580''' are collimated within the polygon deflector 501 and incident on the facet 506. In an example implementation, the focal length of the first lens 582 is about 40-50 mm and/or about 20-60 mm, creating a beam 580' with a diameter of about 8-10 mm and/or about 6-12 mm using a standard fiber of about 10 μm mode field diameter (MFD) and/or about 6-14 μm MFD. In an implementation, a spacing 584a, 584b of the beams in the fiber array 529 would be increments or multiples of about 127 μm, yielding a total subtended angular spread 560 of about 1-4 degrees. In one implementation, a curvature of the positive cylindrical lens is the same as a curvature of the inner surface 536 and/or a transition of an index of refraction from the positive cylindrical lens to air is an opposite of a transition of the index of refraction from air to the polygon deflector 501 across the inner surface 536. In an implementation, the index of refraction of the second lens 584 is about 1.7 or in a range from about 1.3 to about 1.8 and the index of refraction of the polygon deflector 501 is about 1.7 of in a range from about 1.3 to about 1.8 and the curvature of the positive cylindrical lens and inner surface 536 is about 25.4 mm radius and/or in a range from about 20 mm to about 30 mm and/or in a range from about 15 mm to about 40 mm. The collimated beams 580''' incident on the facet 506a are depicted in FIG. 5B which shows the beams 580''' in the plane 541 or plane of FIG. 5D.

FIG. 5E is a schematic diagram that illustrates an example of the polygon deflector 501 of FIG. 5B in two rotation positions 550a, 550b. In an implementation, the collimated beams 580''' incident on the facet 506a from the interior 532 are refracted by the facet 506a, according to Snell's law:

$$n_1 \sin \theta_1 = n_2 \sin \theta_2 \quad (5)$$

where $n_1$ is the index of refraction of the polygon deflector 501, $\theta_1$ is the angle of incidence of the beams 580''' on the facet 506a relative to a normal at the (inside of) the facet 506a, $n_2$ is the index of refraction of a medium (e.g. air=1) surrounding the polygon deflector 501 where the beam 512 is being refracted and $\theta_2$ is the angle of refraction of the beam 512a relative to a normal to the (outside of) the facet 506a. The angle of refraction can be measured as an angle 552a relative to an axis 544 that is orthogonal to the rotation axis 542. As depicted in FIG. 5E, the plurality of beams 512a are refracted at the angle 552a (relative to the axis 544). As the polygon deflector 501 rotates from a first rotation position 550a to a second rotation position 550b about the axis 542, the incident beams 580''' can go from being refracted by one side of the facet 506a (e.g. refracted beams 512a at the angle 552a) to an opposite side of the facet 506a (e.g. refracted beams 512b at an angle 552b), relative to the axis 544, to define a field of view 510 of the refracted beams 512. In an implementation, the field of view 510 is about 50 degrees (e.g. where the index of refraction of the polygon deflector 501 is about 1.6) and about 90 degrees (e.g. where the index of refraction is higher for high index of refraction material, such as Silicon).

FIG. 5F is a schematic diagram that illustrates an example of a partial cross-sectional side view of the polygon deflector 501 of FIG. 5A. In an implementation, FIG. 5F is within the plane 543 of FIG. 5A. In an implementation, the incident beams 580''' are depicted in the plane 543 and an angular spread 560 of the incident beams 580''' is shown. In an implementation, the angular spread 560 is related to the transverse spacing 584 of the fibers 582 of the planar fiber array 529 by:

$$\theta = \tan^{-1} \frac{y}{\text{focal length}} \quad (6)$$

where y is a distance of the fibers 582 outside the focal plane of the lens assembly 505, e.g. the distance of the fibers 582 outside the plane 543 and the focal length is the focal length of the lens 582 of the lens assembly 505. In some implementations, the facet 506 forms a non-orthogonal angle 574 with a top or bottom of the polygon deflector 501. In an implementation, the non-orthogonal angle 574 is any angle other than 90 degrees and/or an angle in a range from about 75 degrees to about 105 degrees and/or an angle in a range from about 60 degrees to about 120 degrees. Additionally, although the non-orthogonal angle 574 in FIG. 5F is less than 90 degrees, the non-orthogonal angle 574 can be greater than 90 degrees, for example the non-orthogonal angle 574 for the facet 506b in FIG. 5A. The angle 574 can be orthogonal and/or about 90 degrees for some or all of the facet 506. The angle 574 can be non-orthogonal for each facet 506 but varies for one or more facets, e.g. less than about 90 degrees for one or more facets 506 but greater than about 90 degrees for one or more facets 506. An advantage of an arrangement with one or more facets 506 with the angle 574 less than 90 degrees and one or more facets 506 with the angle 574 greater than 90 degrees can be that the refracted beams 512 in the plane 543 (FIG. 5F) can alternate between above the horizontal axis 544 (for the facet 506 with the angle 574 less than 90 degrees) to below the horizontal axis 544 (for the facet 506 with the angle 574 greater than 90 degrees). This can permit the beams 512 to be scanned over multiple ranges within the plane 543, e.g. to capture return beam data from objects in these multiple ranges.

In an implementation, the incident beams 580''' on the facet 506 have an angular spread 560 which widens to a greater angular spread 562 after refraction by the facet 506. In an implementation, the angular spread 562 widens based on a ratio of the index of refraction of the polygon deflector 501 (e.g. n=1.5) to an index of refraction of the medium (e.g. air=1) surrounding the polygon deflector 501. In an example implementation, if each beam 580''' has an angular spacing of about 1 degree incident on the facet 506, each refracted beam 512 has an angular spacing of about 1.5 degrees, e.g. a product of the angular spacing of the beams 580''' in the polygon deflector and the index ratio.

In an implementation, in addition to widening the angular spread, a net direction of the beams 512 in the plane 543 is changed by refraction at the facet 506. In an implementation, a centerline 570 of the incident beams 580''' on the facet 506 is refracted by the facet 506 as a centerline 572 of the refracted beams 512, based on Snell's law in equation 5 within the plane 543. Thus, in addition to the increased angular spread 562 of the refracted beams 512, the facet 506 can vary the direction of the centerline 572 of the refracted beams 512, relative to the centerline 570 of the incident beams 580''. In an implementation, variation of the angular spread 560 changes on the order of 50%, e.g. from angular spread 560 of about 1 degree between beams 580 to angular spread 562 of about 1.5 degrees between beams 580. In an implementation, the centerline 572 changes on the order of +5, +10, −5, −10 degrees relative to the centerline 570.

5. Vehicle Control Overview

In some implementations a vehicle is controlled at least in part based on data received from a hi-res Doppler LIDAR system mounted on the vehicle.

Figure 2E:
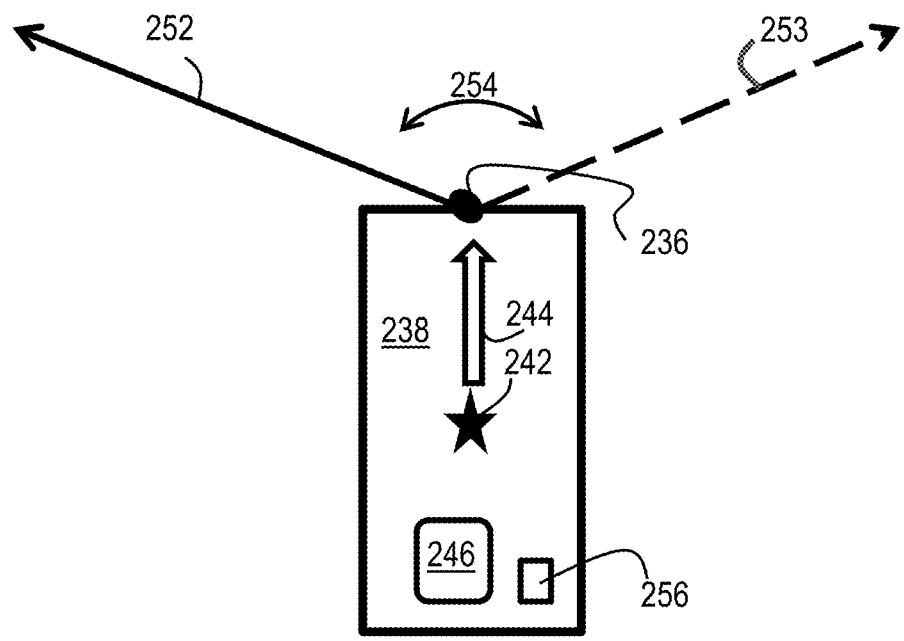
FIG. 2E is a block diagram that illustrates an example system that includes at least one hi-res LIDAR system mounted on a vehicle, according to an implementation.

FIG. 2E is a block diagram that illustrates an example system 234 that includes at least one hi-res Doppler LIDAR system 236 mounted on a vehicle 238, according to an implementation. In an implementation, the LIDAR system 236 is similar to one of the LIDAR systems 200. The vehicle has a center of mass indicted by a star 242 and travels in a forward direction given by arrow 244. In some implementations, the vehicle 238 includes a component, such as a steering or braking system (not shown), operated in response to a signal from a processor, such as the vehicle control module 272 of the processing system 250. In some implementations the vehicle has an on-board processor 246, such as chip set depicted in FIG. 8. In some implementations, the on board processor 246 is in wired or wireless communication with a remote processor, as depicted in FIG. 7. In an implementation, the processing system 250 of the LIDAR system is communicatively coupled with the on-board processor 246 or the processing system 250 of the LIDAR is used to perform the operations of the on board processor 246 so that the vehicle control module 272 causes the processing system 250 to transmit one or more signals to the steering or braking system of the vehicle to control the direction and speed of the vehicle (e.g., to perform collision avoidance with respect to one or more objects detected using information received from the LIDAR system 236). The vehicle control module 272 can control operation of the processing system 250 using at least one of range data or velocity data (including direction data) determined using the LIDAR system 236. The hi-res Doppler LIDAR uses a scanning beam 252 that sweeps from one side to another side, represented by future beam 253, through an azimuthal field of view 254, as well as through vertical angles illuminating spots in the surroundings of vehicle 238. In some implementations, the field of view is 360 degrees of azimuth. In some implementations the scanning optics 218 including the oscillatory scan element 226 and/or unidirectional scan element 228 can be used to scan the beam through the azimuthal field of view 254 or through vertical angles. In an implementation, inclination angle field of view is from about +10 degrees to about −10 degrees or a subset thereof. In an implementation, the maximum design range over the field of view 254 is about 200 meters or in a range from about 150 meters to about 300 meters.

In some implementations, the vehicle includes ancillary sensors (not shown), such as a GPS sensor, odometer, tachometer, temperature sensor, vacuum sensor, electrical voltage or current sensors, among others. In some implementations, a gyroscope 256 is included to provide rotation information.

6. Method for Optimization of Scan Pattern in Coherent LIDAR System

Figure 6:
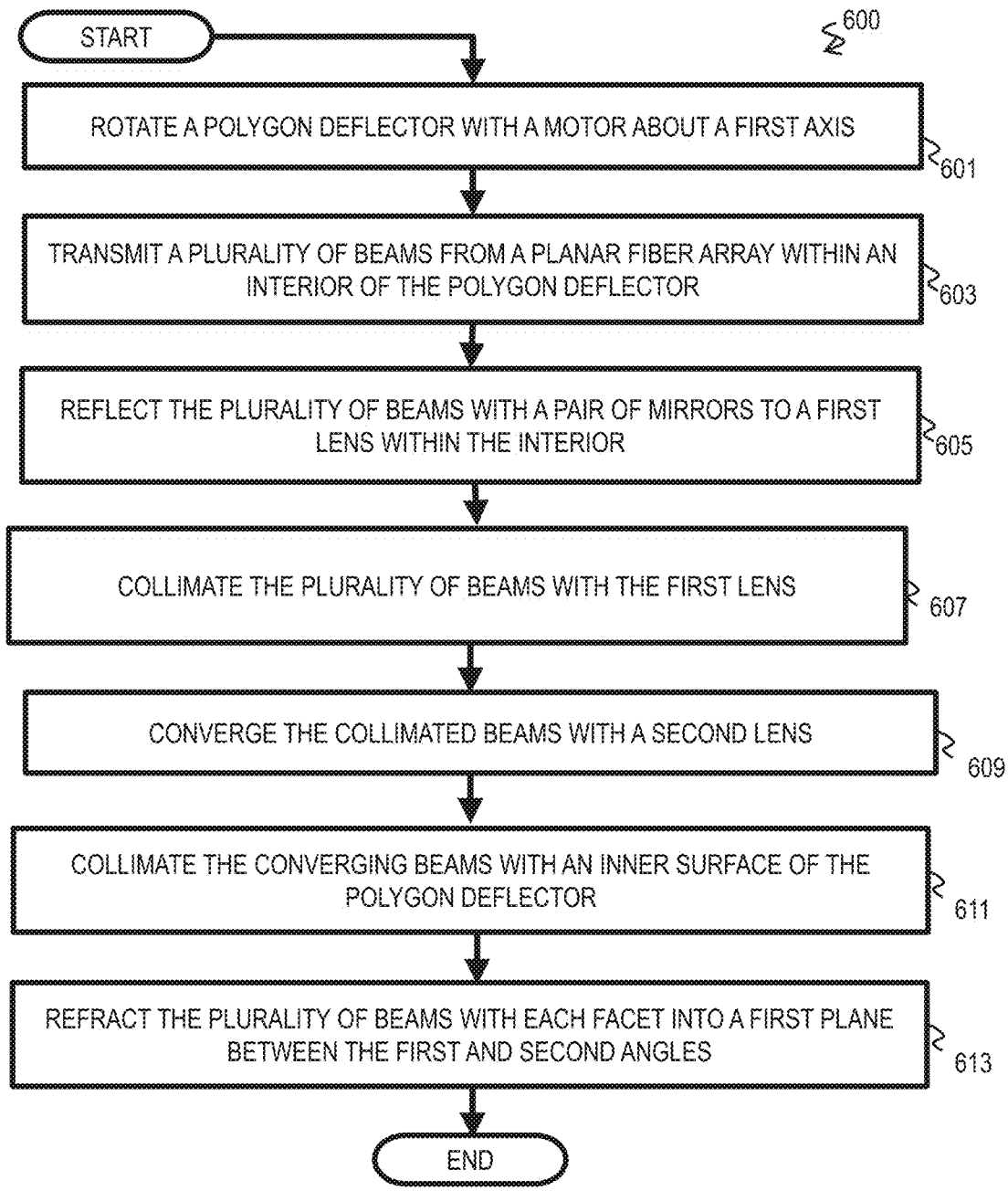
FIG. 6 is a flow chart that illustrates an example method for optimizing a scan pattern of a beam in a first plane between a first angle and a second angle, according to an implementation.

FIG. 6 is a flow chart that illustrates an example method 600 for optimizing a scan pattern of a LIDAR system. In an implementation, the method 600 is for optimizing a scan pattern of a beam in a first direction between a first angle and a second angle based on a desired waveform with a linear slope. In some implementations, the system 600 is for optimizing the scan pattern of a LIDAR system mounted on an autonomous vehicle. Although steps are depicted in FIG. 6 as integral steps in a particular order for purposes of illustration, one or more steps, or portions thereof, can be performed in a different order, or overlapping in time, in series or in parallel, or are omitted, or one or more additional steps are added, or the method is changed in some combination of ways.

In step 601, the polygon deflector 404 is rotated with a motor about a first axis. In an implementation, in step 601 the polygon deflector 501 is rotated with the motor 534 about the axis 540. In an implementation, in step 601 one or more signals is transmitted to the motor 232, 534 to rotate the polygon deflector 404, 501, where the signal includes data that indicates one or more values of a parameter of the rotation (e.g. a value of a rotation speed, a direction of the rotation velocity, a duration of the rotation, etc.).

In step 603, one or more beams are transmitted within the interior 432 of the polygon deflector 404. In an implementation, in step 603 a plurality of beams 580 are transmitted from the planar fiber array 529 within the interior 532 of the polygon deflector 501. In an implementation, in step 603 a light source (e.g. laser source) is positioned within the interior 532 to transmit the beam from within the interior 532.

In step 605, the one or more beams are shaped with one or more optics 405 within the interior 432 so that the beams are collimated and incident on the facet 406 from the interior 432 of the polygon deflector 404. In an implementation, in step 605, the plurality of beam 580 from the planar fiber array 529 are reflected by a pair of mirrors 528a, 528b to a lens assembly 505 including a first lens 582 positioned within the interior 532.

In step 607, the plurality of beams 580 from the mirrors 528a, 528b in step 605 are collimated into beams 580' by the first lens 582. In an implementation, the first lens 582 is an aspheric lens.

In step 609, the plurality of beams 580' from the first lens 582 in step 607 are diverted by a second lens 584. In an implementation, the second lens 584 is a positive cylindrical lens and the beams 580' are converged into converging beams 580" that are incident on the inner surface 534 of the polygon deflector 501.

In step 611, the converging beams 580" from step 609 are collimated by the inner surface 534 of the polygon deflector 501 so that collimated beams 580''' are transmitted into the polygon deflector 501 and incident on the facet 506.

In step 613, the collimated beams 580''' incident on the facet 506 are refracted as beams 512 by the facet 506 into a first plane 541 orthogonal to the rotation axis 542 from a first angle to a second angle that defines a field of view 510 within the plane 541. In an implementation, the field of view 510 is defined by the collimated beams 580''' passing from one side to an opposite side of a facet 506 and ends when the collimated beams 580''' pass over a break in the facet 506. In an implementation, once the collimated beams 580''' pass onto an adjacent facet 506, the refracted beams 512 are re-scanned through the field of view 510 within the plane 541. In another implementation, in step 613 the collimated beams 580''' incident on the facet 506 are refracted as beams 512 into a second plane 543 that is orthogonal to the first plane 541. In an implementation, the refraction of the beams 580''' in the second plane 543 involves an increase of the angular spread 562 of the beams 512, and/or a refraction of the centerline of the beams 512 and/or rotation of the beams 512 within the plane 543 based on the rotation of the polygon deflector 501. The polygon deflector 404 can have a duty cycle greater than 50%, wherein the duty cycle is based on a ratio of a first time based on the refracting step to a second time based on the rotating and shaping steps. The duty cycle can be greater than 70%.

7. Computational Hardware Overview

Figure 7:
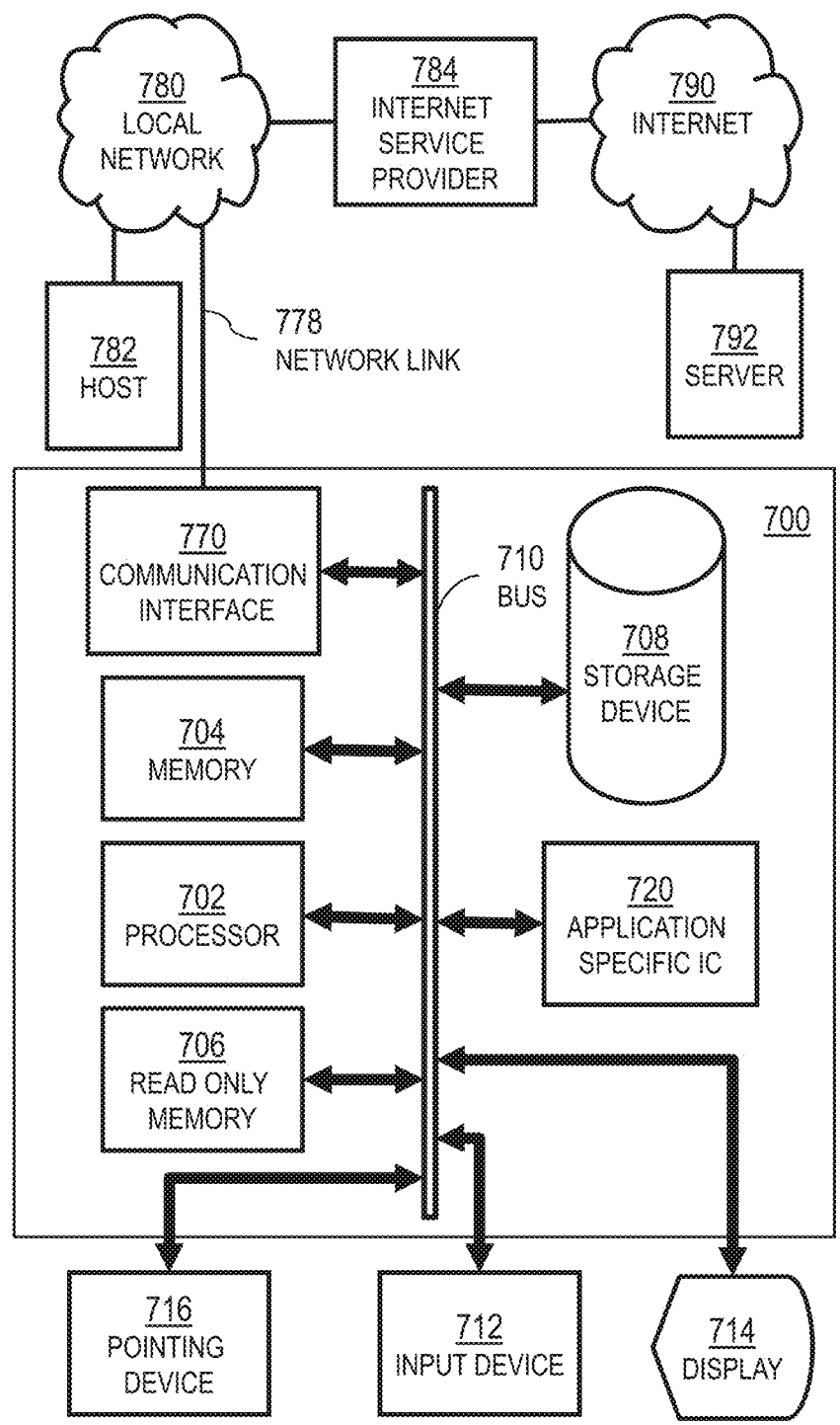
FIG. 7 is a block diagram that illustrates a computer system, according to an implementation.

FIG. 7 is a block diagram that illustrates a computer system 700 that can be used to perform various operations described herein. Computer system 700 includes a communication mechanism such as a bus 710 for passing information between other internal and external components of the computer system 700. Information is represented as physical signals of a measurable phenomenon, typically electric voltages, but including, in other implementations, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some implementations, information called analog data is represented by a near continuum of measurable values within a particular range. Computer system 700, or a portion thereof, constitutes a means for performing one or more steps of one or more methods described herein.

A sequence of binary digits constitutes digital data that is used to represent a number or code for a character. A bus 710 includes many parallel conductors of information so that information is transferred quickly among devices coupled to the bus 710. One or more processors 702 for processing information are coupled with the bus 710. A processor 702 performs a set of operations on information. The set of operations include bringing information in from the bus 710 and placing information on the bus 710. The set of operations also typically include comparing two or more units of information, shifting positions of units of information, and combining two or more units of information, such as by addition or multiplication. A sequence of operations to be executed by the processor 702 constitutes computer instructions.

Computer system 700 also includes a memory 704 coupled to bus 710. The memory 704, such as a random access memory (RAM) or other dynamic storage device, stores information including computer instructions. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of computer instructions. The computer system 700 also includes a read only memory (ROM) 706 or other static storage device coupled to the bus 710 for storing static information, including instructions, that is not changed by the computer system 700. Also coupled to bus 710 is a non-volatile (persistent) storage device 708, such as a magnetic disk or optical disk, for storing information, including instructions, that persists even when the computer system 700 is turned off or otherwise loses power.

Information, including instructions, is provided to the bus 710 for use by the processor from an external input device 712, such as a keyboard containing alphanumeric keys operated by a human user, or a sensor. A sensor detects conditions in its vicinity and transforms those detections into signals compatible with the signals used to represent information in computer system 700. Other external devices coupled to bus 710, used primarily for interacting with humans, include a display device 714, such as a cathode ray tube (CRT) or a liquid crystal display (LCD), for presenting images, and a pointing device 716, such as a mouse or a trackball or cursor direction keys, for controlling a position of a small cursor image presented on the display 714 and issuing commands associated with graphical elements presented on the display 714.

In the illustrated implementation, special purpose hardware, such as an application specific integrated circuit (IC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some implementations, communications interface 770 is an integrated services digital network (ISDN) card or a digital subscriber line (DSL) card or a telephone modem that provides an information communication connection to a corresponding type of telephone line. In some implementations, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 770 sends and receives electrical, acoustic or electromagnetic signals, including infrared and optical signals, that carry information streams, such as digital data.

The term computer-readable medium is used herein to refer to any medium that participates in providing information to processor 702, including instructions for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 702, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 702, except for carrier waves and other signals.

Logic encoded in one or more tangible media includes one or both of processor instructions on a computer-readable storage media and special purpose hardware, such as ASIC 720.

Network link 778 typically provides information communication through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790. A computer called a server 792 connected to the Internet provides a service in response to information received over the Internet. For example, server 792 provides information representing video data for presentation at display 714.

The computer system 700 can be used to implement various techniques described herein. Techniques can be performed by computer system 700 in response to processor 702 executing one or more sequences of one or more instructions contained in memory 704. Such instructions, also called software and program code, may be read into memory 704 from another computer-readable medium such as storage device 708. Execution of the sequences of instructions contained in memory 704 causes processor 702 to perform the method steps described herein. In alternative implementations, hardware, such as application specific integrated circuit 720, may be used in place of or in combination with software to implement various operations described herein. Thus, various implementations are not limited to any specific combination of hardware and software.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server 792 transmits program code for a particular application, requested by a message sent from computer 700, through Internet 790, ISP equipment 784, local network 780 and communications interface 770. The received code may be executed by processor 702 as it is received, or may be stored in storage device 708 or other non-volatile storage for later execution, or both. In this manner, computer system 700 may obtain application program code in the form of a signal on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red a carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
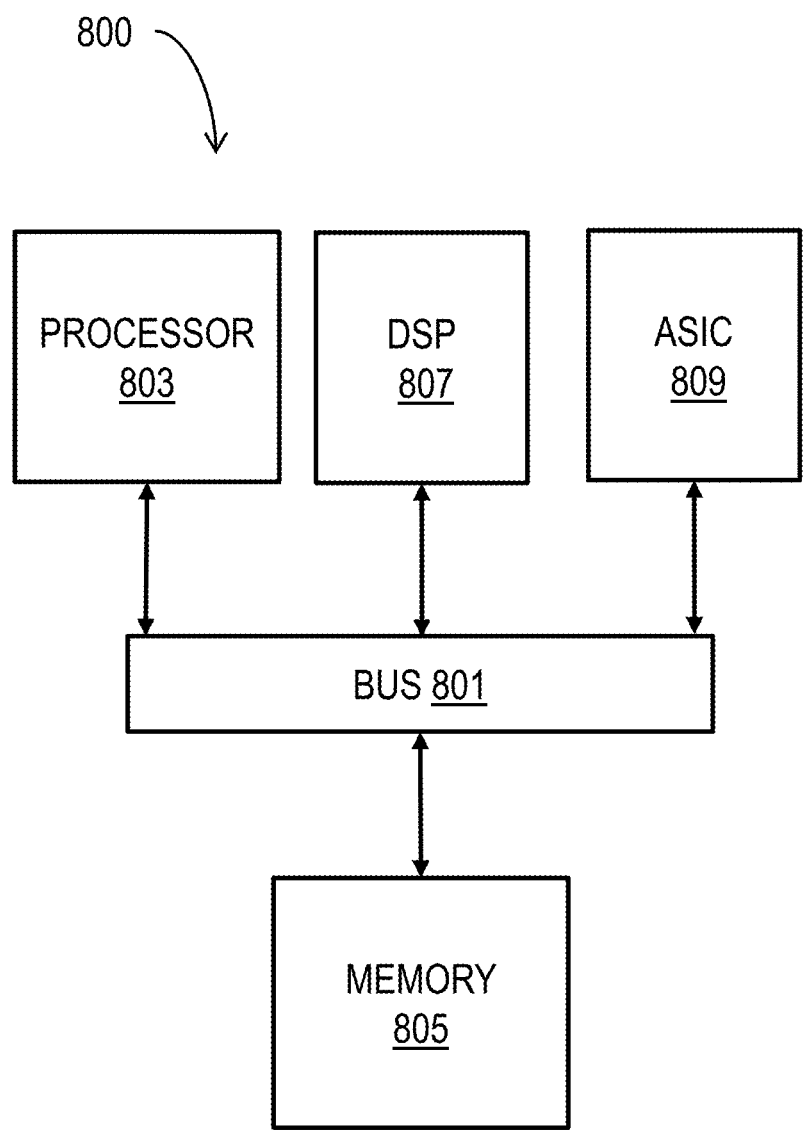
FIG. 8 illustrates a chip set, according to an implementation.

FIG. 8 illustrates a chip set 800. Chip set 800 is programmed to perform one or more steps of a method described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain implementations the chip set can be implemented in a single chip. Chip set 800, or a portion thereof, constitutes a means for performing one or more steps of a method described herein.

In one implementation, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 805 also stores the data associated with or generated by the execution of one or more steps of the methods described herein.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A light detection and ranging (LIDAR) apparatus, comprising:
    a polygon deflector comprising a plurality of facets;
    a motor rotatably coupled to the polygon deflector, the motor configured to rotate the polygon deflector about a first axis orthogonal to a first plane; and
    an optic positioned within an interior of the polygon deflector, the optic configured to collimate a first beam incident on a particular facet of the plurality of facets, the particular facet of the plurality of facets configured to refract the first beam in the first plane between a first angle and a second angle as the polygon deflector rotates about the first axis to output a second beam, the polygon deflector has a duty cycle greater than fifty percent, the duty cycle based on a duration that the polygon deflector refracts the first beam relative to a duration that the polygon deflector is rotated.

2. The LIDAR apparatus of claim 1, wherein the plurality of facets form a non-orthogonal angle with one of a top or a bottom of the polygon deflector such that each facet of the plurality of facets is configured to refract the first beam in a second plane orthogonal to the first plane.

3. The LIDAR apparatus of claim 1, wherein:
    a plurality of first beams in the first plane includes the first beam;
    the LIDAR apparatus comprises a planar fiber array configured to transmit the plurality of first beams within the interior of the polygon deflector; and the optic is configured to shape the plurality of beams with an angular spread in a second plane orthogonal to the first plane.

4. The LIDAR apparatus of claim 3, wherein the planar fiber array is mounted in a focal plane of the optic.

5. The LIDAR apparatus of claim 3, wherein the angular spread is based on a transverse spacing of fibers in the fiber array.

6. The LIDAR apparatus of claim 3, wherein:
the optic comprises a first lens configured to collimate the first beam and a second lens configured to deflect the collimated first beam to provide a deflected first beam; and
an inner surface of the polygon deflector is configured to collimate the deflected first beam within the polygon deflector.

7. The LIDAR apparatus of claim 6, wherein the first lens is an aspheric lens and wherein the second lens is a positive cylindrical lens that has a same curvature as the inner surface.

8. The LIDAR apparatus of claim 6, wherein the optic further comprises a pair of mirrors positioned with respect to each other such that a first mirror of the pair of mirrors is configured to reflect the first beam from the planar fiber array to a second mirror of the pair of the mirrors and wherein the second mirror is configured to reflect the first beam to the first lens.

9. The LIDAR apparatus of claim 3, wherein the optic is a free form toric single lens.

10. The LIDAR apparatus of claim 3, wherein each facet is configured to increase the angular spread of the first beam in the second plane based on a ratio of an index of refraction of the polygon deflector to an index of refraction of a medium surrounding the polygon deflector.

11. The LIDAR apparatus of claim 1, wherein the motor is a brushless DC motor comprising:
a plurality of bearings rotatably coupled to an inner surface of the polygon deflector that defines the interior;
a rotor actuated by coils to rotate the polygon deflector about the first axis; and
a stator positioned in the interior of the polygon deflector, the stator defining a cavity where the optic is positioned.

12. The LIDAR apparatus of claim 1, wherein the polygon deflector is transmissive at a wavelength of the first beam.

13. A LIDAR system, comprising:
a polygon deflector comprising a plurality of facets;
a detector array; and
a processing circuit configured to:
cause the polygon deflector to rotate about a first axis at a rotational frequency;
cause a laser source to transmit a first beam in an interior of the polygon deflector so that the polygon deflector refracts the first beam in a first plane between a first angle and a second angle, the first plane orthogonal to the first axis, the polygon deflector has a duty cycle greater than fifty percent, the duty cycle based on a duration that the polygon deflector refracts the first beam relative to a duration that the polygon deflector is rotated;
receive a signal from the detector array based on a second beam received at the detector array from an object responsive to the first beam; and
determine a range to the object based on the signal received from the detector array.

14. The LIDAR system of claim 13, wherein:
a plurality of first beams in the first plane include the first beam;
the LIDAR apparatus comprises a planar fiber array to transmit the plurality of first beams within the interior of the polygon deflector; and
the optic is configured to shape the plurality of first beams with an angular spread in a second plane orthogonal to the first plane.

15. The LIDAR system of claim 14, wherein:
the optic comprises a first lens configured to collimate the first beam and a second lens configured to deflect the collimated first beam to provide a deflected first beam; and
an inner surface of the polygon deflector is configured to collimate the deflected first beam within the polygon deflector.

16. An autonomous vehicle comprising:
a light detection and ranging (LIDAR) apparatus that comprises:
a polygon deflector comprising a plurality of facets;
a motor rotatably coupled to the polygon deflector, the motor configured to rotate the polygon deflector about a first axis orthogonal to a first plane; and
an optic positioned within an interior of the polygon deflector, the optic configured to collimate a first beam incident on a particular facet of the plurality of facets, the particular facet of the plurality of facets configured to refract the first beam in the first plane between a first angle and a second angle as the polygon deflector rotates about the first axis to output a second beam, the polygon deflector has a duty cycle greater than fifty percent, the duty cycle based on a duration that the polygon deflector refracts the first beam relative to a duration that the polygon deflector is rotated.

17. The autonomous vehicle of claim 16, wherein the plurality of facets form a non-orthogonal angle with one of a top or a bottom of the polygon deflector such that each facet of the plurality of facets is configured to refract the beam in a second plane orthogonal to the first plane.

18. The autonomous vehicle of claim 16, wherein:
a plurality of first beams in the first plane include the first beam;
the LIDAR apparatus comprises a planar fiber array configured to transmit the plurality of first beams within the interior of the polygon deflector; and
the optic is configured to shape the plurality of beams with an angular spread in a second plane orthogonal to the first plane;
wherein the planar fiber array is mounted in a focal plane of the optic.

19. The autonomous vehicle of claim 18, wherein:
the optic comprises a first lens configured to collimate the first beam and a second lens configured to deflect the collimated first beam to provide a deflected first beam; and
an inner surface of the polygon deflector is configured to collimate the deflected first beam within the polygon deflector;
wherein the first lens is an aspheric lens and the second lens is a positive cylindrical lens that has a same curvature as the inner surface.

* * * * *